United States Patent
Ha et al.

(10) Patent No.: US 10,351,060 B2
(45) Date of Patent: Jul. 16, 2019

(54) PARKING ASSISTANCE APPARATUS AND VEHICLE HAVING THE SAME

(71) Applicant: LG ELECTRONICS INC., Seoul (KR)

(72) Inventors: Seongju Ha, Seoul (KR); Daebum Kim, Seoul (KR); Ilho Kim, Seoul (KR)

(73) Assignee: LG Electronics Inc., Seoul (KR)

(*) Notice: Subject to any disclaimer, the term of this patent is extended or adjusted under 35 U.S.C. 154(b) by 30 days.

(21) Appl. No.: 15/622,669

(22) Filed: Jun. 14, 2017

(65) Prior Publication Data
US 2017/0355307 A1     Dec. 14, 2017

(30) Foreign Application Priority Data
Jun. 14, 2016 (KR) .................. 10-2016-0074112

(51) Int. Cl.
*B60R 1/00* (2006.01)
*B60Q 9/00* (2006.01)
(Continued)

(52) U.S. Cl.
CPC ............ *B60R 1/00* (2013.01); *B60Q 9/005* (2013.01); *B60Q 9/006* (2013.01); *G06K 9/00812* (2013.01); *G08G 1/143* (2013.01); *G08G 1/168* (2013.01); *H04N 7/183* (2013.01); *B60K 2350/1004* (2013.01); *B60K 2350/106* (2013.01); *B60K 2350/1024* (2013.01); *B60K 2350/1044* (2013.01); *B60K 2350/1052* (2013.01); *B60K 2350/1072* (2013.01); *B60K 2350/2013* (2013.01);
(Continued)

(58) Field of Classification Search
None
See application file for complete search history.

(56) References Cited

U.S. PATENT DOCUMENTS

| 7,924,171 B2 | 4/2011 | Kawabata et al. |
| 9,731,765 B2 | 8/2017 | Yang |

(Continued)

FOREIGN PATENT DOCUMENTS

| CN | 101426670 | 5/2009 |
| CN | 101804812 | 8/2010 |

(Continued)

*Primary Examiner* — Jonathan M Dager
*Assistant Examiner* — Garrett F Evans
(74) *Attorney, Agent, or Firm* — Fish & Richardson P.C.

(57) ABSTRACT

A parking assistance apparatus includes a first sensor configured to sense a first environment corresponding to a first distance around a vehicle; a second sensor configured to sense a second environment corresponding to a second distance around the vehicle that is greater than the first distance; and a display configured to display a graphic image. The parking assistance apparatus also includes at least one processor configured to: acquire first information regarding the first environment around the vehicle and second information regarding the second environment around the vehicle; detect an available parking space based on the first information and based on the second information; and based on an available parking space being detected outside of the first environment, control the display to display information regarding the available parking space.

19 Claims, 33 Drawing Sheets

(51) Int. Cl.
*G06K 9/00* (2006.01)
*G08G 1/14* (2006.01)
*H04N 7/18* (2006.01)
*G08G 1/16* (2006.01)
*B60R 1/12* (2006.01)
*G02B 27/01* (2006.01)
*G06F 3/0485* (2013.01)
*G06T 11/60* (2006.01)

(52) U.S. Cl.
CPC ............... *B60K 2350/2052* (2013.01); *B60K 2350/2065* (2013.01); *B60K 2350/352* (2013.01); *B60K 2350/357* (2013.01); *B60K 2350/921* (2013.01); *B60R 2001/1253* (2013.01); *B60R 2300/105* (2013.01); *B60R 2300/107* (2013.01); *B60R 2300/205* (2013.01); *B60R 2300/207* (2013.01); *B60R 2300/301* (2013.01); *B60R 2300/303* (2013.01); *B60R 2300/607* (2013.01); *B60R 2300/806* (2013.01); *B60R 2300/8093* (2013.01); *G02B 27/01* (2013.01); *G06F 3/0485* (2013.01); *G06T 11/60* (2013.01)

(56) References Cited

U.S. PATENT DOCUMENTS

| | | | | |
|---|---|---|---|---|
| 2005/0060073 | A1* | 3/2005 | Tanaka | B62D 15/0285 701/36 |
| 2010/0238051 | A1* | 9/2010 | Suzuki | B60R 1/00 340/932.2 |
| 2012/0191337 | A1* | 7/2012 | Schoenherr | B62D 15/027 701/400 |
| 2012/0200430 | A1* | 8/2012 | Spahl | G01C 21/3685 340/932.2 |
| 2017/0043808 | A1* | 2/2017 | Yang | B62D 15/0285 |
| 2017/0278305 | A1* | 9/2017 | Sisbot | G06T 19/006 |

FOREIGN PATENT DOCUMENTS

| | | |
|---|---|---|
| CN | 103209875 | 7/2013 |
| CN | 106427994 | 2/2017 |
| DE | 102012222562 | 6/2014 |
| JP | H09-171594 | 6/1997 |
| JP | 2008269358 | 11/2008 |
| JP | 2009276927 | 11/2009 |
| JP | 2010018180 | 1/2010 |
| JP | 4465773 | 5/2010 |
| JP | 2011114850 | 6/2011 |
| JP | 2014106703 | 6/2014 |
| JP | 2014144709 | 8/2014 |
| JP | 2015174531 | 10/2015 |
| JP | 2016007961 | 1/2016 |
| KR | 10-2012-0070250 | 6/2012 |
| KR | 10-2014-0020424 | 2/2014 |
| KR | 10-2015-0056235 | 5/2015 |

* cited by examiner

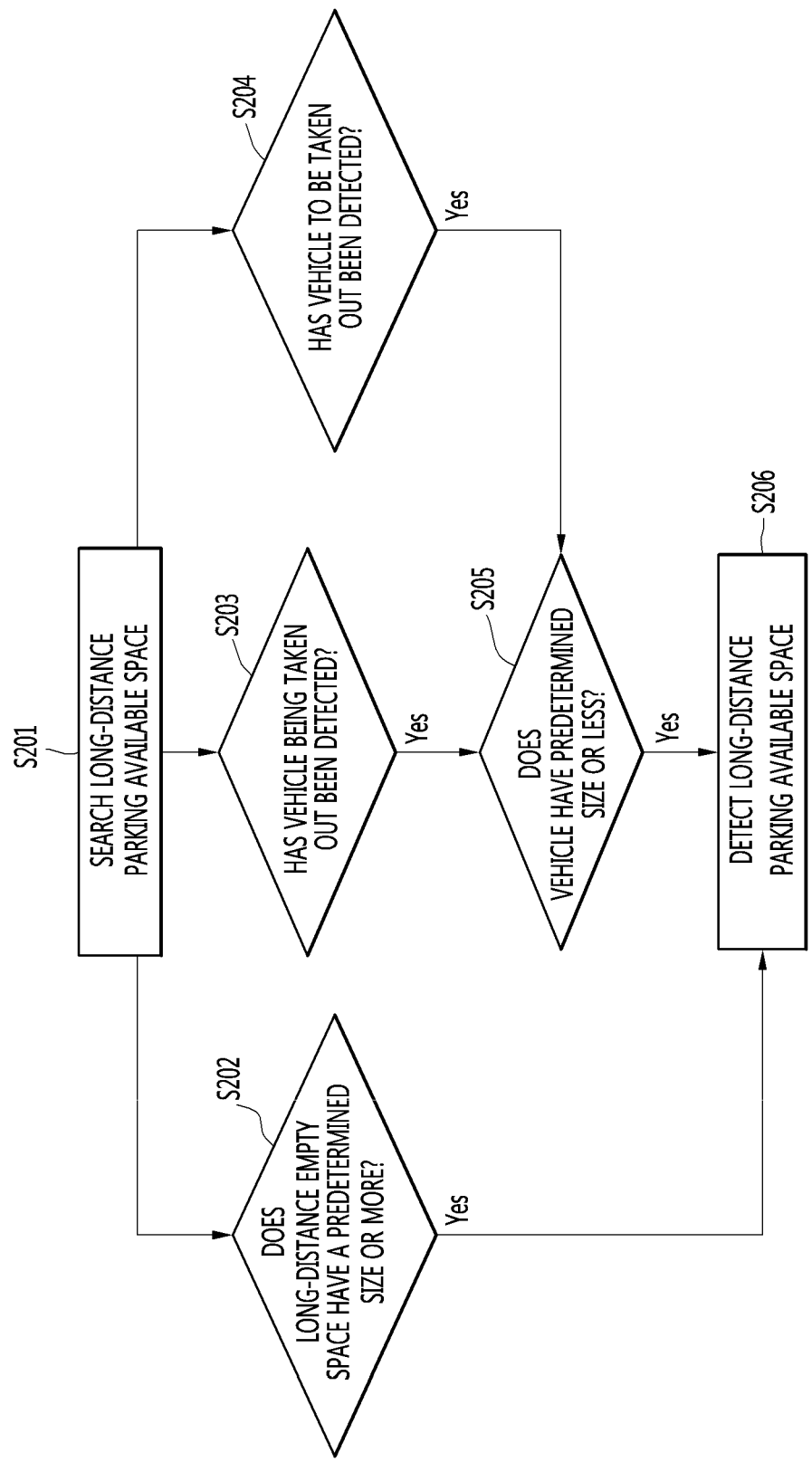

PARKING ASSISTANCE APPARATUS AND VEHICLE HAVING THE SAME

CROSS-REFERENCE TO RELATED APPLICATIONS

The present application claims the benefit of an earlier filing date and right of priority to Korean Patent Application No. 10-2016-0074112, filed on Jun. 14, 2016, the content of which is herein incorporated by reference in its entirety.

TECHNICAL FIELD

The present disclosure relates to a parking assistance apparatus provided in a vehicle, and a vehicle having the same.

BACKGROUND

A vehicle is an apparatus that transports a user riding therein in a desired direction. A representative example of a vehicle is an automobile.

A vehicle typically includes a power source, such as an internal combustion engine vehicle, an external combustion engine vehicle, a gas turbine vehicle, an electric vehicle, etc. according to a type of motor used.

An electric vehicle typically utilizes an electric motor using electric energy and includes a pure electric vehicle, a hybrid electric vehicle (HEV), a plug-in hybrid electric vehicle (PHEV), a fuel cell electric vehicle (FCEV), etc.

Recently, intelligent vehicles have been actively developed for safety or convenience of a driver or pedestrian.

An intelligent vehicle is an advanced vehicle implementing information technology (IT) and is sometimes referred to as a "smart vehicle." Some intelligent vehicles provide improved traffic efficiency by implementing an advanced vehicle system and via association with an intelligent traffic system (ITS).

In addition, research into sensors mounted in such an intelligent vehicle has been actively conducted. Such sensors typically include, for example, a camera, an infrared sensor, a radar, a global positioning system (GPS), a Lidar, or a gyroscope. In particular, a camera is often an important sensor playing the role of human eyes.

SUMMARY

Implementations described herein provide a parking assistance apparatus that utilizes both long-range and short-range sensors to automatically detect an available parking space. The parking assistance apparatus may determine whether the parking space is in a short-distance environment or a long-distance environment around the vehicle, and display parking information accordingly.

Implementations may also provide a vehicle having the above-described parking assistance apparatus.

In one aspect, a parking assistance apparatus may include a first sensor configured to sense a first environment corresponding to a first distance around a vehicle; a second sensor configured to sense a second environment corresponding to a second distance around the vehicle, the second distance being greater than the first distance; and a display configured to display a graphic image. The parking assistance apparatus may also include at least one processor configured to: acquire first information regarding the first environment around the vehicle and second information regarding the second environment around the vehicle from the respective first sensor and the second sensor; detect an available parking space based on the first information and based on the second information; and, based on an available parking space being detected outside of the first environment, control the display to display information regarding the available parking space.

In some implementations, the parking assistance apparatus may further include a monitoring unit configured to monitor a driver. The at least one processor may further be configured to: detect a physical motion of the driver indicating an intent to park the vehicle; and based on detecting the physical motion of the driver indicating the intent to park the vehicle and based on the vehicle travelling at a predetermined speed or less for a predetermined time or more, control the display to propose executing a parking assistance mode.

In some implementations, the second sensor may include at least one of a blind spot detection sensor configured to sense a quadrangular area at a side rear of the vehicle or a stereo camera configured to photograph a front or rear area of the vehicle and configured to sense a distance to an object. The first sensor may include an around-view monitoring camera configured to photograph surroundings of the vehicle.

In some implementations, the at least one processor may further be configured to: based on an empty space having a predetermined size or more being detected outside of the first environment, determine the empty space as the available parking space.

In some implementations, the at least one processor may further be configured to: based on a second vehicle being detected as exiting a space, determine, as the available parking space, the space from which the second vehicle exits.

In some implementations, the at least one processor may further be configured to: based on a second vehicle being detected as performing an exiting operation, determine a position of the second vehicle as the available parking space. The second vehicle that is detected as performing the exiting operation may be a vehicle that indicates a state of at least one of a vehicle in which a second driver is riding, a vehicle in which a brake lamp is turned on, or a vehicle from which an engine starting sound is generated.

In some implementations, the at least one processor may further be configured to: calculate a size of the second vehicle; compare the size of the second vehicle with a size of the vehicle; and based on comparing the size of the second vehicle with the size of the vehicle, determine whether the vehicle is to be parked.

In some implementations, the at least one processor may further be configured to: determine a parking standby position around the detected available parking space; control the vehicle to move to the parking standby position while the second vehicle is exiting the space; and control the vehicle to be on standby at the parking standby position until a time at which the second vehicle completes exiting the space.

In some implementations, the at least one processor may further be configured to: based on a first parking space being detected at a first side of the vehicle and a second parking space being detected at a second side of the vehicle, scan the first parking space at the first side of the vehicle through the first sensor, and scan the second parking space at the second side of the vehicle through the second sensor.

In some implementations, the first sensor may include an image sensor, the second sensor may include a distance-measuring sensor, and the at least one processor may further be configured to: detect the available parking space through the image sensor; and based on an obstacle in the available parking space being detected through the distance-measuring sensor, determine that the available parking space is inappropriate for parking.

In some implementations, the first sensor may include an image sensor, the second sensor may include a distance measuring sensor, and the at least one processor may further be configured to: based on a parking restriction sign being detected in the available parking space through the image sensor after the available parking space is detected through the distance measuring sensor, determine that the available parking space is inappropriate for parking.

In some implementations, the at least one processor may further be configured to: based on the available parking space being detected, provide, through the display, a graphic user interface (GUI) for performing parking in the available parking space.

In some implementations, providing, through the display, the graphic user interface (GUI) for performing parking in the available parking space may include displaying an image at a time when the available parking space is to be viewed and displaying a graphic image designating the available parking space.

In some implementations, providing, through the display, the graphic user interface (GUI) for performing parking in the available parking space may include displaying a scroll GUI for displaying short-distance images that were previously photographed according to a user scroll input.

In some implementations, the at least one processor may further be configured to: generate a virtual map by synthesizing information regarding environments that were previously detected around the vehicle; and control the display to display the virtual map and a graphic image representing the available parking space on the virtual map.

In some implementations, the display may include a windshield display configured to display graphic images on a windshield of the vehicle. The windshield display may be configured to display an augmented reality view that designates the available parking space.

In some implementations, the first sensor may include an around-view monitoring camera configured to photograph surroundings of the vehicle. The at least one processor may further be configured to: based on a detection that the available parking space is photographed by the around-view monitoring camera, control the display to display an image of a view around the vehicle.

In some implementations, the at least one processor may further be configured to, based on a plurality of available parking spaces being detected: evaluate the plurality of available parking spaces through at least one criteria; and automatically set one of the plurality of available parking spaces as a target parking space based on an evaluation of the plurality of available parking spaces through the at least one criteria.

In some implementations, the at least one processor may configured be to control the display to display a graphic image for guiding the vehicle to travel to the available parking space.

In another aspect, a vehicle may include the parking assistance apparatus according to one or more of the implementations described above.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that may include one or more processing devices and memory to store executable instructions to implement the stated functions.

The details of one or more implementations are set forth in the accompanying drawings and the description below. Other features will be apparent from the description and drawings, and from the claims.

BRIEF DESCRIPTION OF THE DRAWINGS

FIG. 10 is a flowchart illustrating an example of detecting a long-distance available parking space according to some implementations;

DETAILED DESCRIPTION

Figure 1:
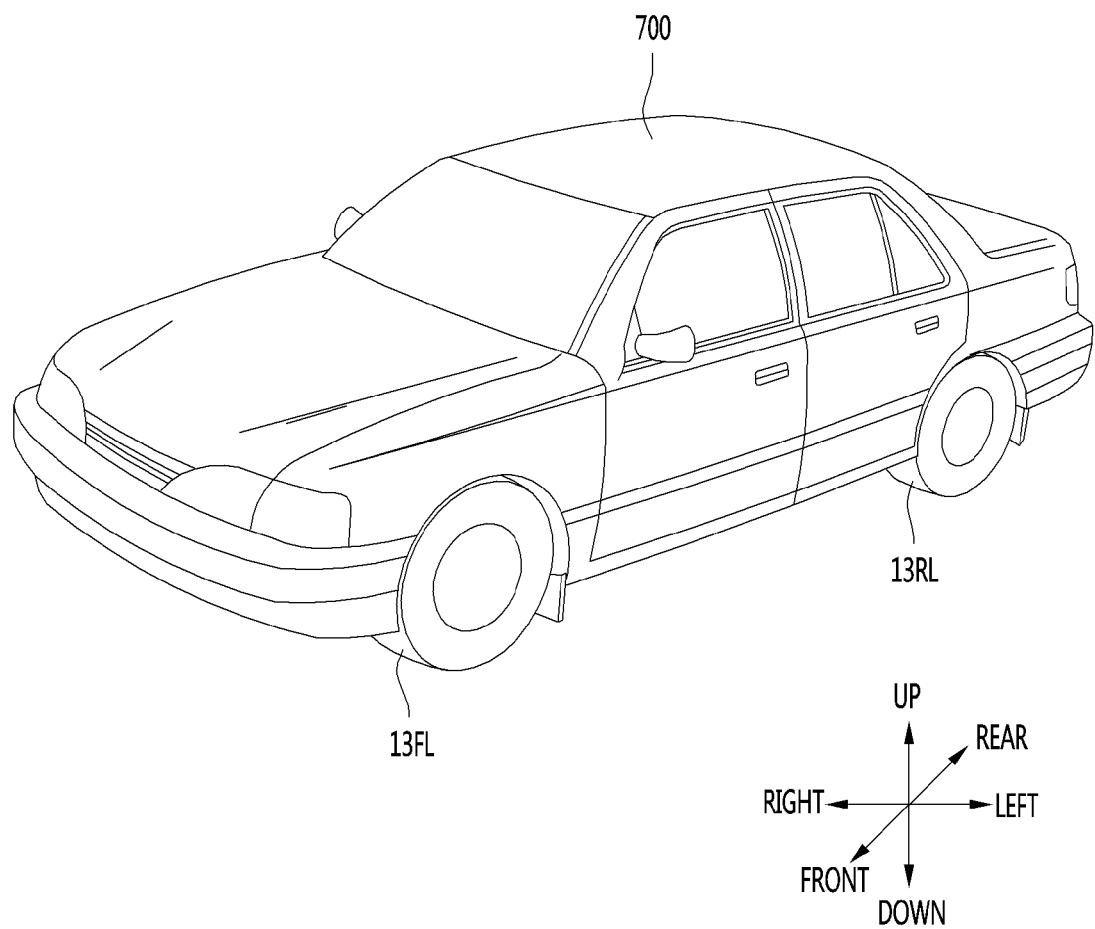
FIG. 1 is a diagram illustrating an example of an outer appearance of a vehicle having a parking assistance apparatus according to an implementation.

Implementations described herein provide a parking assistance apparatus for a vehicle that utilizes both long-range and short-range sensors to automatically detect an available parking space around the vehicle.

In some scenarios, a vehicle may implement a parking assistance function that assists a driver and improves driving safety and convenience. For example, a vehicle may include parking assistance technology for automatically performing one or more parking functions of a vehicle, thereby assisting a driver with difficult parking situations.

An example of parking assistance technology is technology for detecting parking lines using a camera and performing parking of a vehicle in a parking space detected through the parking lines. Here, a general camera system for detecting a parking space may include an around-view monitoring (AVM) system for photographing directions around a vehicle and/or may include a rear camera system.

However, in some scenarios, an AVM system or a rear camera system may have a limited photographing area, and therefore may not be able to detect an available parking space located at a long distance from the vehicle. Therefore, a driver should directly detect an available parking space, drive a vehicle up to an area in which the available parking space is photographed, and then execute a parking assistance function, which cannot be referred to as automatic parking in the true sense of the word.

In addition, a parking assistance apparatus may be limited by other difficulties. For example, it may be difficult to detect an available parking space in a situation where a parking line cannot be detected. Furthermore, an available parking space may fail to be detected in situations where another vehicle is being taken out or being ready to be taken out from the parking space.

Also, in scenarios where an available parking space is detected using only an image-based sensor, the available parking space may be limited to being two-dimensionally detected. Hence, when a three-dimensional obstacle exists, the available parking space may fail to be detected.

Furthermore, when an available parking space is detected using only a distance-based sensor, there may be difficult in detecting parking lines, parking signs such as a "no parking" sign, or other relevant environmental features relevant to the parking space.

Implementations are described herein that enable a parking assistance apparatus for a vehicle that detects an available parking space using both a long-distance sensor and a short-distance sensor, thereby providing improved assistance for parking of the vehicle.

In some implementations, the parking assistance apparatus may distinguish between a short-distance environment and a long-distance environment around the vehicle. The parking assistance apparatus may detect that a parking space is available outside of the short-distance environment, and may display information regarding the parking space that is located outside the short-distance environment. As such, the parking assistance apparatus may better assist a driver in locating an available parking space at various locations around the vehicle.

A vehicle as described in this disclosure may include, for example, a car or a motorcycle, or any suitable motorized vehicle. Hereinafter, a car will be described as an example.

A vehicle as described in this disclosure may be powered by any suitable power source, and may be, for example, an internal combustion engine vehicle including an engine as a power source, a hybrid vehicle including both an engine and an electric motor as a power source, and/or an electric vehicle including an electric motor as a power source.

In the following description, the left of a vehicle refers to the left-hand side of the vehicle in the direction of travel and the right of the vehicle refers to the right-hand side of the vehicle in the direction of travel.

In the following description, a left hand drive (LHD) vehicle will be described unless otherwise stated, although implementations are not limited to such and may also be implemented in right hand drive vehicles.

In the following description, the parking assistance apparatus provided in a vehicle may be implemented as a separate apparatus mounted in the vehicle or may include one or more components that are part of the vehicle. The parking assistance apparatus provided in a vehicle may exchange information for data communication with the vehicle and perform a parking assistance function. A set of at least some components of the vehicle may be implemented as part of the parking assistance apparatus.

Figure 2:
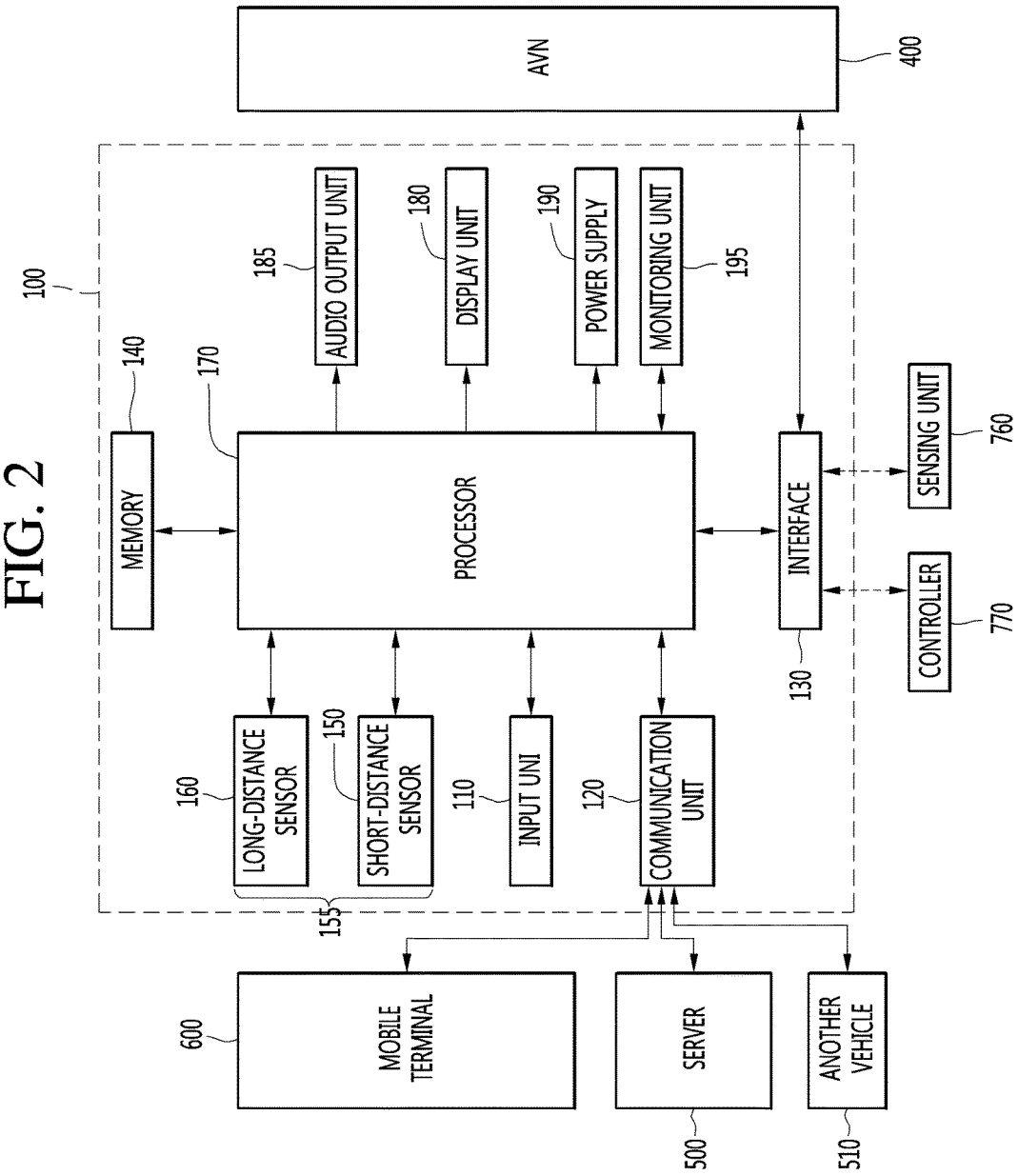
FIG. 2 is a block diagram illustrating an example of a parking assistance apparatus according to an implementation.

In scenarios where the parking assistance apparatus is separately provided, at least some components of the parking assistance apparatus, such as one or more components in FIG. 2, may be components of the vehicle or components of another apparatus mounted in the vehicle. Such external units may transmit and receive data via an interface of the parking assistance apparatus and thus may be understood as being included in the parking assistance apparatus.

Hereinafter, for convenience of description, the parking assistance apparatus will be described according to some implementations that directly include the components shown in FIG. 2, although implementations are not limited to such, as described above.

Hereinafter, a parking assistance apparatus according to some implementations will be described in detail with reference to the drawings.

Referring to FIG. 1, a vehicle 700 according to an implementation may include wheels 13FL and 13RL rotated by a power source and a parking assistance apparatus providing a user with a parking assistance function.

The parking assistance apparatus according to some implementations may provide a parking assistance function of detecting an available parking space by sensing one or more environments around the vehicle, providing a user with information on the detected available parking space, and, if the user selects the available parking space, parking the vehicle in the selected target parking space by performing an automatic parking operation.

In some implementations, the parking assistance apparatus acquires information on a short-distance environment around the vehicle using a short-distance sensor, thereby searching what will be referred to as a "short-distance available parking space." In addition, the parking assistance apparatus acquires information on a long-distance environment around the vehicle using a long-distance sensor, thereby searching what will be referred to as a "long-distance available parking space." Thus, in such implementations, the parking assistance apparatus may more quickly and effectively detect an available parking space in a wider search area around the vehicle.

The short-distance environment and the long-distance environment may be designated according to various criteria. For example, a reference for distinguishing between a long-distance environment and a short-distance environment may be a limit range around the vehicle, which the short-distance sensor can sense, or a boundary at which the information on the short-distance environment, acquired by the short-distance sensor, is displayed. In such scenarios, if the short-distance sensor senses an available parking space within a predetermined radius around the vehicle, then an area within the predetermined radius may be designated as a short-distance environment, and an area outside the predetermined radius may be designated as a long-distance environment. However, implementations are not limited thereto, as the short-distance environment may be designated as any suitable environment that is closer to the vehicle than the long-distance environment.

In some implementations, the short-distance sensor may be an around-view monitoring (AVM) system for photographing an environment around the vehicle. In such implementations, an environment around the vehicle that is photographed by an AVM camera may be designated as a short-distance environment, and an environment outside of a photographing area of the AVM camera may be designated as a long-distance environment. As such, if an AVM image is displayed on a display, then the image displayed on the display may be limited to the short-distance environment.

Further, the parking assistance apparatus may detect multiple environments at different distances using one or more sensors. For example, the parking assistance apparatus may include both a short-distance sensor based on image sensing and a long-distance sensor based on space sensing, thereby more accurately providing a user with information regarding an available parking space.

Also, the parking assistance apparatus may provide a graphic user interface for effectively displaying, to the user, information on detected long-distance/short-distance available parking spaces, and easily setting the parking assistance function.

In some implementations, the parking assistance apparatus may determine a route such that automatic parking is safely performed in a selected long-distance target parking space and may perform an automatic operation for following the route. In such implementations, the parking assistance apparatus may thereby provide a parking assistance function of safely and quickly performing automatic parking in a desired space.

Hereinafter, examples of components constituting such a parking assistance apparatus will be described in detail with reference to FIGS. 2 to 7.

Referring to FIG. 2, the parking assistance apparatus 100 according to some implementations may include an input unit 110, a communication unit 120, an interface 130, a memory 140, a sensor unit 155 including a long-distance sensor and a short-distance sensor, at least one processor 170, a display unit 180, an audio output unit 185, a monitoring unit 195, and a power supply 190. However, units of the parking assistance apparatus 100 are not essential to implement the parking assistance apparatus 100. Therefore, the parking assistance apparatus 100 described in this specification may have components of which number is greater or less than that of the described-above components.

Each component will now be described in more detail. The parking assistance apparatus 100 may include the input unit 110 for receiving user input.

For example, a user may input, through the input unit 110, a setting for the parking assistance function provided by the parking assistance apparatus 100, execution of turning on/off power of the parking assistance apparatus 100, or the like.

In an implementation, the input unit 110 may receive an input for allowing the user to select an available parking space and to set the selected available parking space as a target parking space.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the parking assistance apparatus 100 may include the communication unit 120 for communicating with another vehicle 510, a terminal 600 and a server 500.

In an implementation, the communication unit 120 may receive information on a long-distance available parking space from a parking lot management server 510 or another vehicle around the vehicle. That is, if the parking lot management server 500 or the other vehicle 510, which previously acquired information on an empty available parking space in a parking lot, transmits information on an available parking space to the communication unit 120 of the vehicle 700, the communication unit 120 may receive the information on the available parking space, thereby previously detecting the long-distance available parking space.

Also, the communication unit 120 may transmit information on a target parking space and a parking route to the other vehicle 510 around the vehicle 700, so that the other vehicle 510 does not interfere with parking of the vehicle 700.

The parking assistance apparatus 100 may receive communication information including at least one of navigation information, driving information of another vehicle and traffic information via the communication unit 120. In contrast, the parking assistance apparatus 100 may transmit information on this vehicle via the communication unit 120.

In detail, the communication unit 120 may receive at least one of position information, weather information and road traffic condition information (e.g., transport protocol experts group (TPEG), etc.) from the mobile terminal 600 and/or the server 500.

The communication unit 120 may receive traffic information from the server 500 having an intelligent traffic system (ITS). Here, the traffic information may include traffic signal information, lane information, vehicle surrounding information or position information.

In addition, the communication unit 120 may receive navigation information from the server 500 and/or the mobile terminal 600. Here, the navigation information may include at least one of map information related to vehicle driving, lane information, vehicle position information, set destination information and route information according to the destination.

For example, the communication unit 120 may receive the real-time position of the vehicle as the navigation information. In detail, the communication unit 120 may include a global positioning system (GPS) module and/or a Wi-Fi (Wireless Fidelity) module and acquire the position of the vehicle.

In addition, the communication unit 120 may receive driving information of the other vehicle 510 from the other vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the parking assistance apparatus 100 may pair with each other automatically or by executing a user application.

The communication unit 120 may exchange data with the other vehicle 510, the mobile terminal 600 or the server 500 in a wireless manner.

In detail, the communication module 120 may perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit module 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

In addition, the parking assistance apparatus 100 may pair with the mobile terminal located inside the vehicle using a short-range communication method and wirelessly exchange data with the other vehicle 510 or the server 500 using a long-distance wireless communication module of the mobile terminal.

Next, the parking assistance apparatus 100 may include the interface 130 for receiving data of the vehicle and transmitting a signal processed or generated by the at least one processor 170.

In an implementation, the parking assistance apparatus 100 may transmit a vehicle drive control signal for performing automatic parking through the interface 130, thereby controlling the vehicle 700 to travel in a target parking space.

In detail, after an automatic parking route is designed, the parking assistance apparatus 100 generates a drive control signal for allowing the vehicle to follow the automatic parking route, and directly transmits the generated drive control signal to a controller 770 or a drive unit, so that the vehicle can automatically travel. For example, the parking assistance apparatus 100 may generate at least one of a steering control signal for automatically controlling vehicle steering, an accelerator control signal for controlling driving of the power source of the vehicle, a brake control signal for controlling a brake of the vehicle, and a transmission control signal for controlling a transmission of the vehicle, and control various drive units of the vehicle by transmitting the generated control signal through the interface 130, so that the vehicle 700 can be automatically parked.

In detail, the parking assistance apparatus 100 may receive at least one of driving information of another vehicle, navigation information and sensor information via the interface 130.

In addition, the parking assistance apparatus 100 may transmit a control signal for executing the parking assistance function or information generated by the parking assistance apparatus 100 to the controller 770 of the vehicle via the interface 130.

To this end, the interface 130 may perform data communication with at least one of the controller 770 of the vehicle, an audio-video-navigation (AVN) apparatus 400 and the sensing unit 760 using a wired or wireless communication method.

In detail, the interface 130 may receive navigation information by data communication with the controller 770, the AVN apparatus 400 and/or a separate navigation apparatus.

In addition, the interface 130 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor based on rotation of the steering wheel, a vehicle interior temperature sensor, a vehicle interior humidity sensor, a door sensor, etc. The position module may include a GPS module for receiving GPS information.

The interface 130 may receive user input via the user input unit 110 of the vehicle. The interface 130 may receive user input from the input unit of the vehicle or via the controller 770. That is, when the input unit is provided in the vehicle, user input may be received via the interface 130.

In addition, the interface 130 may receive traffic information acquired from the server. The server 500 may be located at a traffic control surveillance center for controlling traffic. For example, when traffic information is received from the server 500 via the communication unit 120 of the vehicle, the interface 130 may receive traffic information from the controller 770.

Next, the memory 140 may store a variety of data for overall operation of the parking assistance apparatus 100, such as a program for processing or control of the at least one processor 170, which may be a controller in some implementations.

In addition, the memory 140 may store data and commands for operation of the parking assistance apparatus 100 and a plurality of application programs or applications executed in the parking assistance apparatus 100. At least some of such application programs may be downloaded from an external server through wireless communication. At least one of such application programs may be installed in the parking assistance apparatus 100 upon release, in order to provide the basic function (e.g., the parking assistance information guide function) of the parking assistance apparatus 100.

Such application programs may be stored in the memory 140 and may be executed to perform operation (or function) of the parking assistance apparatus 100 by the processor 170.

The memory 140 may store data for checking an object included in an image. For example, the memory 140 may store data for checking a predetermined object using a predetermined algorithm when the predetermined object is detected from an image of the vicinity of the vehicle acquired through a long-distance sensor 160, which may be, for example, a camera.

For example, the memory 140 may store data for checking the object using the predetermined algorithm when the predetermined algorithm such as a lane, a traffic sign, a two-wheeled vehicle and a pedestrian is included in an image acquired through the long-distance sensor 160, which may be a camera.

The memory 140 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the parking assistance apparatus 100 may operate in association with a network storage for performing a storage function of the memory 140 over the Internet.

Next, the monitoring unit 195 may acquire information on the internal state of the vehicle.

Information sensed by the monitoring unit 195 may include at least one of facial recognition information, fingerprint information, iris-scan information, retina-scan information, hand geometry information and voice recognition information. The motoring unit 195 may include other sensors for sensing such biometric information.

In an implementation, the monitoring unit 195 may be a camera for photographing a driver. The monitoring unit 195 photographs the driver, and the processor extracts a specific pattern of action of the driver, thereby determining a driver's parking intention. For example, the monitoring unit 195 may detect an action in which the driver looks around, for example, the driver's head turning, a predetermined number of times. Based on detecting such a pattern of action by the driver, the processor may detect such an action pattern as a driver's parking intention, thereby automatically executing the parking assistance function.

Next, the parking assistance apparatus 100 may further include the sensor unit 155 for a searching available parking space by sensing objects around the vehicle. The parking assistance apparatus 100 may sense objects around the vehicle through the separate sensor unit 155, and may receive, through the interface 130, sensor information acquired from the sensing unit 760. The acquired sensor information may be included in information on environments around the vehicle.

In an implementation, the sensor unit 155 may include a short-distance sensor 150 for sensing a short-distance area around the vehicle and a long-distance sensor 160 for sensing a long-distance area around the vehicle. Here, a reference for distinguishing between the long-distance area and the short-distance area may be a limit range around the vehicle, which the short-distance sensor 150 can sense, and an area out of the limit range may become the long-distance area.

The long-distance sensor 160 and the short-distance sensor 150 may include a distance sensor for sensing positions of objects located around the vehicle and a camera for acquiring images by photographing surroundings of the vehicle.

First, the distance sensor precisely senses a position of an object from the vehicle, a direction in which the object is spaced apart, a distance at which the object is spaced apart, a direction in which the object moves, or the like, thereby acquiring information on an environment around the vehicle. The distance sensor continuously measures the sensed position of the object, thereby accurately sensing a change in positional relationship between the object and the vehicle.

The distance sensor may sense an object located in an area of at least one of the front/rear/left/right of the vehicle. To this end, the distance sensor may be disposed at various positions of the vehicle. In detail, the distance sensor may be disposed at a position of at least one of the front/rear/left/right and ceiling of a body of the vehicle. The distance sensor may include one or more among various distance measuring sensors such as a Lidar sensor, a laser sensor, an ultrasonic waves sensor, and a stereo camera.

For example, the distance sensor may accurately measure, as a laser sensor, a positional relationship between the vehicle and the object, using time-of-flight (TOF) and/or phase shift according to a laser signal modulation method.

Meanwhile, information on an object may be acquired as the processor 170 analyzes an image photographed by the camera.

In detail, the parking assistance apparatus 100 photographs surroundings of the vehicle using the camera, detects objects around the vehicle as the processor 170 analyzes images of the surroundings of the vehicles, determines attributes of the objects, thereby generating information on environments around the vehicle.

Here, image information is information on at least one of the kind of an object, traffic signal information indicated by the object, a distance between the object and the vehicle, and a position of the object, and may be included in the sensor information.

In detail, the processor 170 performs analysis on an object by detecting the object from an image photographed through image processing, tracking the object, and measuring a distance of the object from the vehicle, so that image information can be generated.

In an implementation, the short-distance sensor 150 may be an around view monitoring camera (AVM camera) for searching a short-distance area by photographing all directions within a predetermined range of the vehicle or/and a parking assistance ultrasonic sensor (PAS ultrasonic sensor) for measuring a distance of an object from the vehicle within a predetermined range around the vehicle. Here, the short-distance area may be defined as an area photographed and displayed by the AVM camera.

In detail, the AVM camera as the short-distance sensor 150 may be provided in plurality at various positions.

Figure 3:
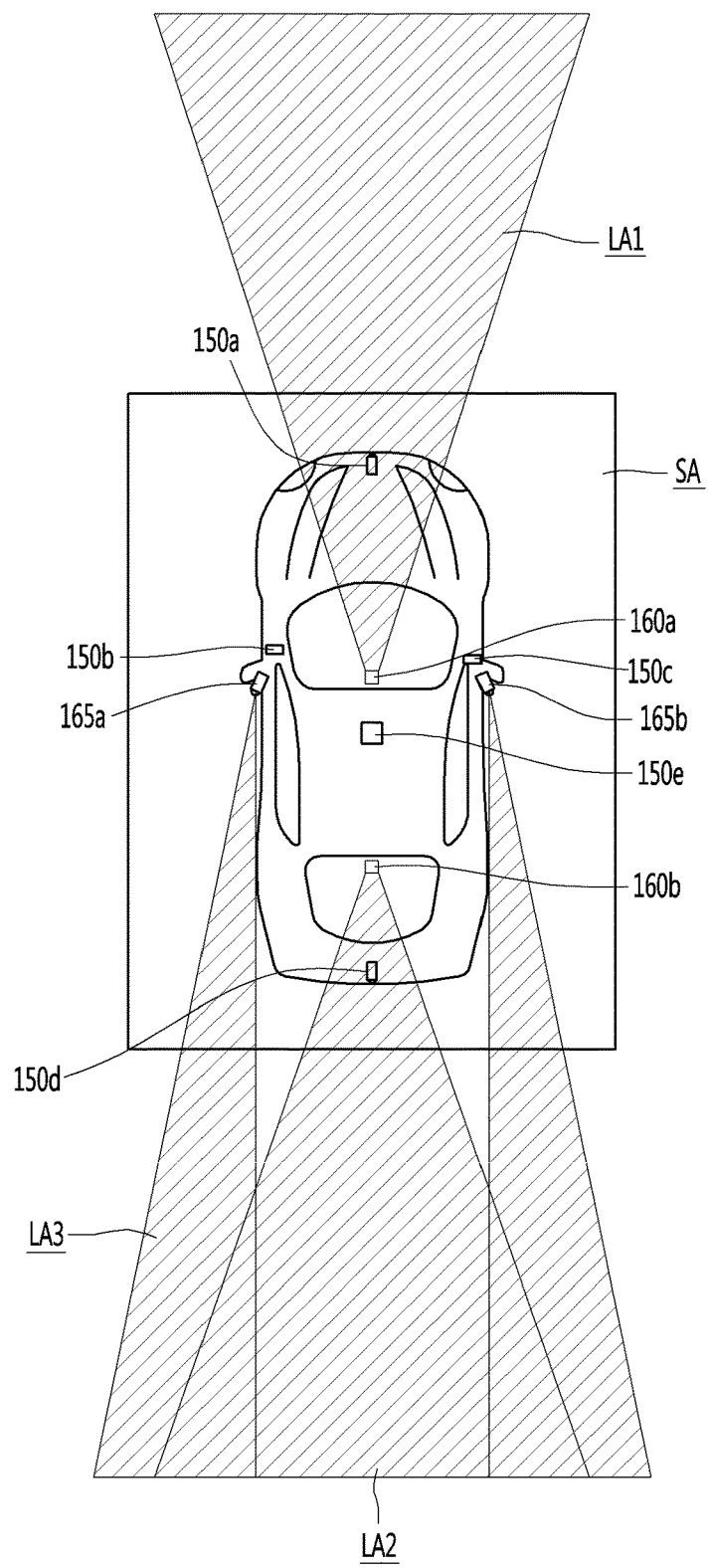
FIG. 3 is a diagram illustrating an example of sensors of a vehicle having the parking assistance apparatus according to some implementations.

Referring to FIG. 3, each of AVM cameras 150a, 150b, 150c, 150d, and 150e is disposed at a position of at least one of the front/rear/left/right and ceiling of the vehicle, to photograph a direction of the position at which each AVM camera is disposed, thereby scanning a short-distance area SA.

In detail, a left camera 150b may be disposed in a case surrounding a left side mirror. Alternatively, the left camera 150b may be disposed at the outside of the case surrounding the left side mirror. Alternatively, the left camera 150b may be disposed in one area at the outside of a left front door, a left rear door, or a left fender.

A right camera 150c may be disposed in a case surrounding a right side mirror. Alternatively, the right camera 150c may be disposed at the outside of the case surrounding the right side mirror. Alternatively, the right camera 150c may be disposed in one area at the outside of a right front door, a right rear door, or a right fender.

A rear camera 150d may be disposed near a rear number plate or a trunk switch. A front camera 150a may be disposed near an emblem or a radiator grill.

A ceiling camera 150e may be disposed on the ceiling of the vehicle to photographs all of the front/rear/left/right directions of the vehicle.

Meanwhile, the processor 170 may synthesize images photographed in all directions, thereby providing an around view image obtained by viewing the vehicle from its top. When the around view image is generated, boundary portions occurs between areas of the images. Blending processing is performed on the boundary portions, so that the boundary portions can be naturally displayed.

Therefore, in an implementation, the short-distance area SA may be an area displayed as an around view image.

In some implementations, the long-distance sensor 160 may include at least one of a front stereo camera 160a, a rear stereo camera 160b, and blind spot detection sensors 165a and 165b, which acquire information on environments of a long-distance area LA.

In detail, the long-distance sensor 160 may be the front stereo camera 160a that acquires an image by photographing the front of the vehicle and, simultaneously, measures a distance from an object in the photographed image. That is, the front stereo camera 160a may acquire information on an environment of a front long-distance area LA1 of the vehicle 700.

Through information on a long-distance environment around the vehicle, acquired by the front stereo camera 160a, the processor 170 may provide a driving assistance function of at least one of a lane keeping assist system (LKAS), a lane departure warning system (LDWS), an adaptive cruise control (ACC) system, a traffic sign recognition (TSR) system, and a high beam assistance (HBA) system.

Also, the processor 170 may detect a long-distance available parking space from information on a long-distance environment around the vehicle, acquired by the front stereo camera 160a.

That is, the parking assistance apparatus 100 may provide a long-distance parking assistance function using the front stereo camera 160a that provides the existing driving assistance function.

The long-distance sensor 160 may be the rear stereo camera 160b that acquires an image by photographing the rear of the vehicle and, simultaneously, measures a distance from an object in the photographed image. The rear stereo camera 160b may acquire information on an environment of a rear long-distance area LA2 of the vehicle 700.

Also, the long-distance sensor 160 may be each of the blind spot detection sensors 165a and 165b, which measures a distance from an object located at the side/rear of the vehicle. Each of the blind spot detection sensors 165a and 165b may acquire information on an environment of a side/rear long-distance area LA3 of the vehicle 700.

Each of the blind spot detection sensors 165a and 165b may be a distance sensor, and a blind spot detection (BSD) function may be provided as information on an environment around the vehicle, acquired by each of the blind spot detection sensors 165a and 165b.

That is, the parking assistance apparatus 100 may provide a long-distance parking assistance function using the blind spot detection sensor 165a and 165b that provide the existing driving assistance function.

In an implementation, the short-distance sensor 150 may be each of the AVM cameras 150a, 150b, 150c, 150d, and 150e, and the long-distance sensor 160 may be the front stereo camera 160a for detecting an available parking space in the front long-distance area LA1 or/and each of the blind spot detection sensors 165a and 165b that detects an available parking space in the side/rear long distance area LA3.

Hereinafter, the short-distance sensor 150 is each of the AVM cameras 150a, 150b, 150c, 150d, and 150e, and the long-distance sensor 160 is each of the front stereo camera 160a and the blind spot detection sensors 165a and 165b, but the present disclosure is not limited thereto.

The parking assistance apparatus 100 may detect a short-distance available parking space using the short-distance sensor 150, detect a front long-distance available parking space using the front stereo camera 160a, and detect side and rear long-distance available parking spaces using the blind spot detection sensors 165a and 165b.

Also, the parking assistance apparatus 100 may precisely detect an available parking space, using the image-based short-distance sensor 150 and the long-distance sensor 160 configured to measure a distance.

Meanwhile, each of the cameras of the short-distance sensor 150 and the long-distance sensor 160 may directly include an image sensor and an image processing module. The camera may process a still image or moving image obtained by the image sensor (e.g., CMOS or CCD). Also, the image processing module may extract required image information by processing the still image or moving image obtained by the image sensor, and may transmit the extract image information to the processor 170.

In order to for the processor 170 to more easily perform object analysis, each of the above-described cameras may be a stereo camera for photographing an image and, simultaneously, measuring a distance from an object.

Hereinafter, the long-distance sensor 160 and a method of detecting information on an environment around the vehicle using the long-distance sensor 160 will be described in detail with reference to FIGS. 4 to 6.

Figure 4:
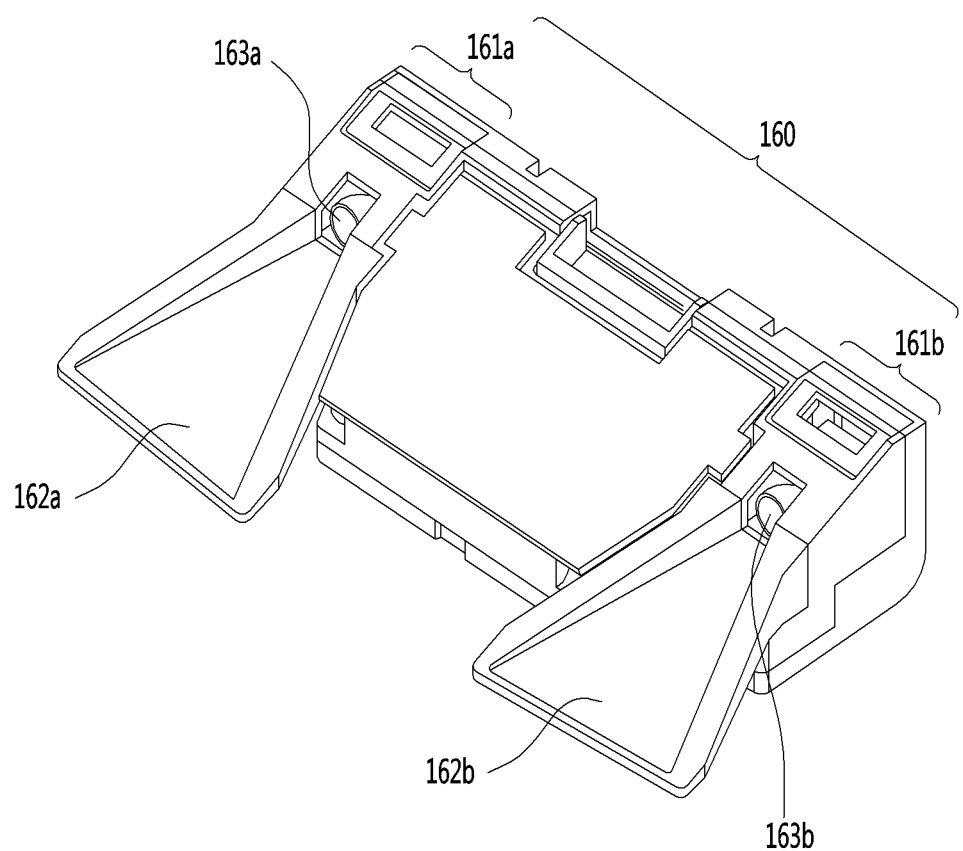
FIG. 4 is a diagram illustrating an example of a front stereo camera according to some implementations.

First, referring to FIG. 4, the long-distance sensor 160 may include a first camera 161a having a first lens 163a and a second camera 161b having a second lens 163b.

Meanwhile, the parking assistance apparatus may further include a first light shield 162a for shielding light incident into the first lens 163a and a second light shield 162b for shielding light incident into the second lens 163b.

The parking assistance apparatus may acquire stereo images of surroundings of the vehicle, perform disparity detection on the basis of the stereo images, perform object detection on at least one stereo image on the basis of at least one stereo image, and continuously track the movement of an object after the object is detected.

Figure 5:
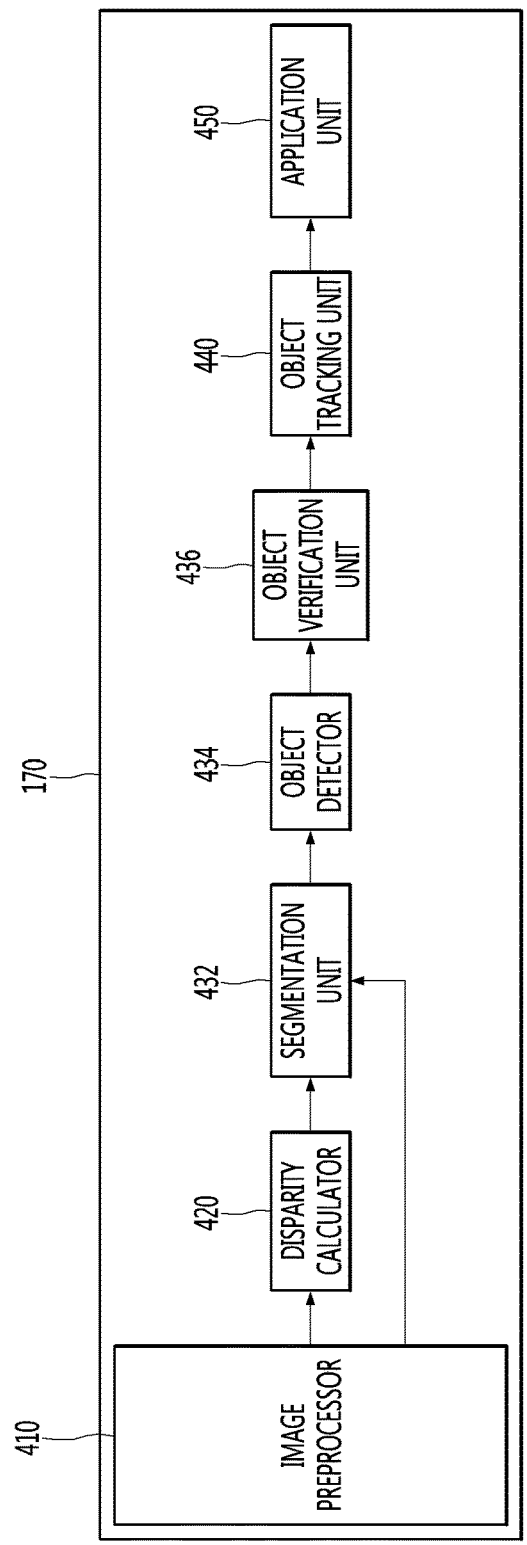
FIGS. 5 and 6 are diagrams illustrating examples of generating image information in an image of the front stereo camera according to some implementations.

Referring to FIG. 5, as an example of an internal block diagram of the processor 170, the processor 170 in the parking assistance apparatus 100 may include an image preprocessor 410, a disparity calculator 420, an object detector 434, an object tracking unit 440, and an application unit 450. In FIG. 5 and the following description, it is illustrated that an image is processed in an order of the image preprocessor 410, the disparity calculator 420, the object detector 434, the object tracking unit 440, and the application unit 450, but the present disclosure is not limited thereto.

The image preprocessor 410 may receive images from the camera, thereby performing preprocessing.

Specifically, the image preprocessor 410 may perform, on the images, noise reduction, rectification, calibration, color enhancement, color space conversion (CSC), interpolation, camera gain control, etc. Accordingly, it is possible to acquire images clearer than stereo images photographed by the camera.

The disparity calculator 420 may receive the images signal-processed by the image preprocessor 410, and perform stereo matching on the received images, thereby acquiring a disparity map according to the stereo matching.

In this case, the stereo matching may be performed in units of pixels of the stereo images or in units of predetermined blocks of the stereo images. Meanwhile, the disparity map may refer to a map representing, as numerical values, binocular parallax information of stereo images, i.e., left and right images.

A segmentation unit 432 may perform segmentation and clustering on at least one of the images, based on disparity information from the disparity calculator 420.

Specifically, the segmentation unit 432 may separate a background and a foreground with respect to at least one of the stereo images, based on the disparity information.

As an example, the segmentation unit 432 may calculate, as the background, an area in which the disparity information is equal to or smaller than a predetermined value in the disparity map, and exclude the corresponding area. Accordingly, the foreground can be relatively separated. As another example, the segmentation unit 432 may calculate, as the foreground, an area in which the disparity information is equal to or greater than the predetermined value in the disparity map, and extract the corresponding area. Accordingly, the foreground can be separated.

As described above, the foreground and the background are separated based on the disparity information extracted on the basis of the stereo images, so that it is possible to reduce a signal processing speed, a signal processing amount, etc. when a subsequent object is detected.

Next, the object detector 434 may detect an object on the basis of an image segment from the segmentation unit 432.

That is, the object detector 434 may detect an object with respect to at least one of the images, based on the disparity information.

Specifically, the object detector 434 may detect an object with respect to at least one of the images. For example, the object detector 434 may detect an object from a foreground separated by the image segment.

Next, an object verification unit 436 may classify and verify the separated object.

To this end, the object verification unit 436 may use an identification method using a neural network, a support vector machine (SVM) method, an AdaBoost identification method using Haar-like features, a histogram of oriented gradients (HOG) method, etc.

Meanwhile, the object verification unit 436 may verify other vehicles, lanes, road surfaces, signs, danger zones, tunnels, etc., which are located around the vehicle.

The object tracking unit 440 may perform tracking on the verified object. For example, the object tracking unit 440 may verify objects in the acquired stereo image, calculate movements or motion vectors of the verified objects, and track a movement, etc. of a corresponding object, based on the calculated movements or motion vectors. Accordingly, it is possible to track other vehicles, lanes, road surfaces, signs, danger zones, tunnels, etc., which are located around the vehicle.

Next, the application unit 450 may calculate a risk, etc. of the vehicle, based on various objects, e.g., other vehicles, lanes, road surfaces, signs, etc., which are located around the vehicle. Also, the application unit 450 may calculate a possibility of collision with a vehicle in front, a slip of the vehicle, etc.

In addition, the application unit 450 may output, as vehicle driving assistance information, a message, etc. for notifying a user of the information, based on the calculated risk, possibility of collision, the slip of the vehicle, or the like. Alternatively, the application unit 450 may generate, as vehicle control information, a control signal for controlling the posture or driving of the vehicle.

Meanwhile, the image preprocessor 410, the disparity calculator 420, the segmentation unit 432, the object detector 434, the object verification unit 436, the object tracking unit 440, and the application unit 450 may be internal components of an image processor (see FIG. 31) in the processor 170.

Meanwhile, according to an implementation, the processor 170 may include only some of the image preprocessor 410, the disparity calculator 420, the segmentation unit 432, the object detector 434, the object verification unit 436, the object tracking unit 440, and the application unit 450. If the camera is configured as a mono camera or an around view camera, the disparity calculator 420 may be excluded. Also, according to an implementation, the segmentation unit 432 may be excluded.

Figure 6:
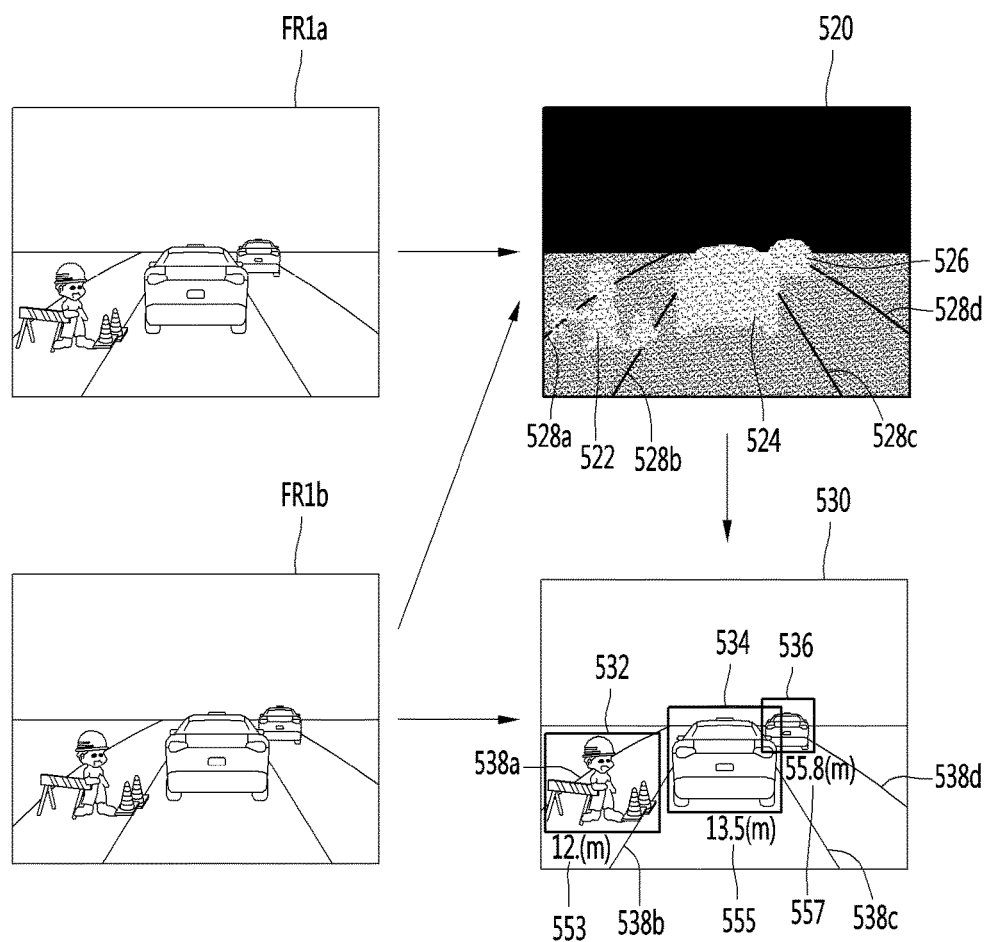

Referring to FIG. 6, the camera may acquire stereo images during a first frame period.

The disparity calculator 420 receives stereo images FR1a and FR1b signal-processed by the image preprocessor 410, and performs stereo matching on the received stereo images FR1a and FR1b, thereby acquiring a disparity map 520.

The disparity map 520 is obtained by levelizing a binocular parallax between the stereo images FR1a and FR1b. In the disparity map 520, calculation is performed such that a distance to the vehicle becomes closer as a disparity level becomes larger, and the distance to the vehicle becomes more distant as the disparity level becomes smaller.

Meanwhile, when the disparity map is displayed, the disparity map may be displayed such that luminance becomes higher as the disparity level becomes larger, and the luminance becomes lower as the disparity level becomes smaller.

In this figure, it is illustrated that first to fourth lanes 528a, 528b, 528c, and 528d have corresponding disparity levels in the disparity map 520, and a construction area 522, a first vehicle 524 in front and a second vehicle 526 in front have corresponding disparity levels in the disparity map 520.

The segmentation unit 432, the object detector 434, and the object verification unit 436 detect segments and objects with respect to at least one of the stereo images FR1a and FR1b, and verify the objects, based on the disparity map 520.

In this figure, it is illustrated that objects are detected and verified with respect to a second stereo image FR1b, using the disparity map 520.

That is, the first to fourth lanes 538a, 538b, 538c, and 538d, the construction area 532, the first vehicle 534 in front, and the second vehicle 536 in front may be detected and verified in an image 530.

By performing image processing as described above, the parking assistance apparatus 100 may acquire, using the camera, various information on environments around the vehicle, such as what objects around the vehicle are and where the objects are located.

Next, the parking assistance apparatus 100 may further include a display unit for displaying a graphic image of the parking assistance function.

The display unit 180 may include a plurality of displays.

In detail, the display unit 180 may include a first display 180a for projecting and displaying a graphic image onto and on a vehicle windshield W. That is, the first display 180a is a head up display (HUD) and may include a projection module for projecting the graphic image onto the windshield W. The graphic image projected by the projection module may have predetermined transparency. Accordingly, a user may simultaneously view the front and rear sides of the graphic image.

The graphic image may overlap the image projected onto the windshield W to achieve augmented reality (AR).

The display unit may include a second display 180b separately provided inside the vehicle to display an image of the parking assistance function.

In detail, the second display 180b may be a display of a vehicle navigation apparatus or a cluster located at an internal front side of the vehicle.

The second display 180b may include at least one selected from among a Liquid Crystal Display (LCD), a Thin Film Transistor LCD (TFT LCD), an Organic Light Emitting Diode (OLED), a flexible display, a 3D display, and an e-ink display.

The second display 180b may be combined with a touch input unit to achieve a touchscreen.

Next, the audio output unit 185 may audibly output a message for explaining the function of the parking assistance apparatus 100 and checking whether the parking assistance function is performed. That is, the parking assistance apparatus 100 may provide explanation of the function of the parking assistance apparatus 100 via visual display of the display unit 180 and audio output of the audio output unit 185.

Next, the haptic output unit may output an alarm for the parking assistance function in a haptic manner. For example, the parking assistance apparatus 100 may output vibration to the user when a warning is included in at least one of navigation information, traffic information, communication information, vehicle state information, advanced parking assistance system (ADAS) function and other parking convenience information.

The haptic output unit may provide directional vibration. For example, the haptic output unit may be provided in a steering apparatus for controlling steering to output vibration. Left or right vibration may be output according to the left and right sides of the steering apparatus to enable directional haptic output.

In addition, the power supply 190 may receive power and supply power necessary for operation of the components under control of the processor 170.

Lastly, the parking assistance apparatus 100 may include the processor 170 for controlling overall operation of the units of the parking assistance apparatus 100.

In addition, the processor 170 may control at least some of the components described with reference to FIG. 3 in order to execute the application program. Further, the processor 170 may operate by combining at least two of the components included in the parking assistance apparatus 100es, in order to execute the application program.

The at least one processor 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, and electric units for the implementation of other functions.

The processor 170 may be controlled by the controller or may control various functions of the vehicle through the controller.

The processor 170 may control overall operation of the parking assistance apparatus 100 in addition to operation related to the application programs stored in the memory 140. The processor 170 may process signals, data, information, etc. via the above-described components or execute the application programs stored in the memory 140 to provide appropriate information or functions to the user.

Hereinafter, the parking assistance function provided by the parking assistance apparatus 100 including the above-described components will now be described in detail with reference to FIGS. 8 to 25.

Figure 8:
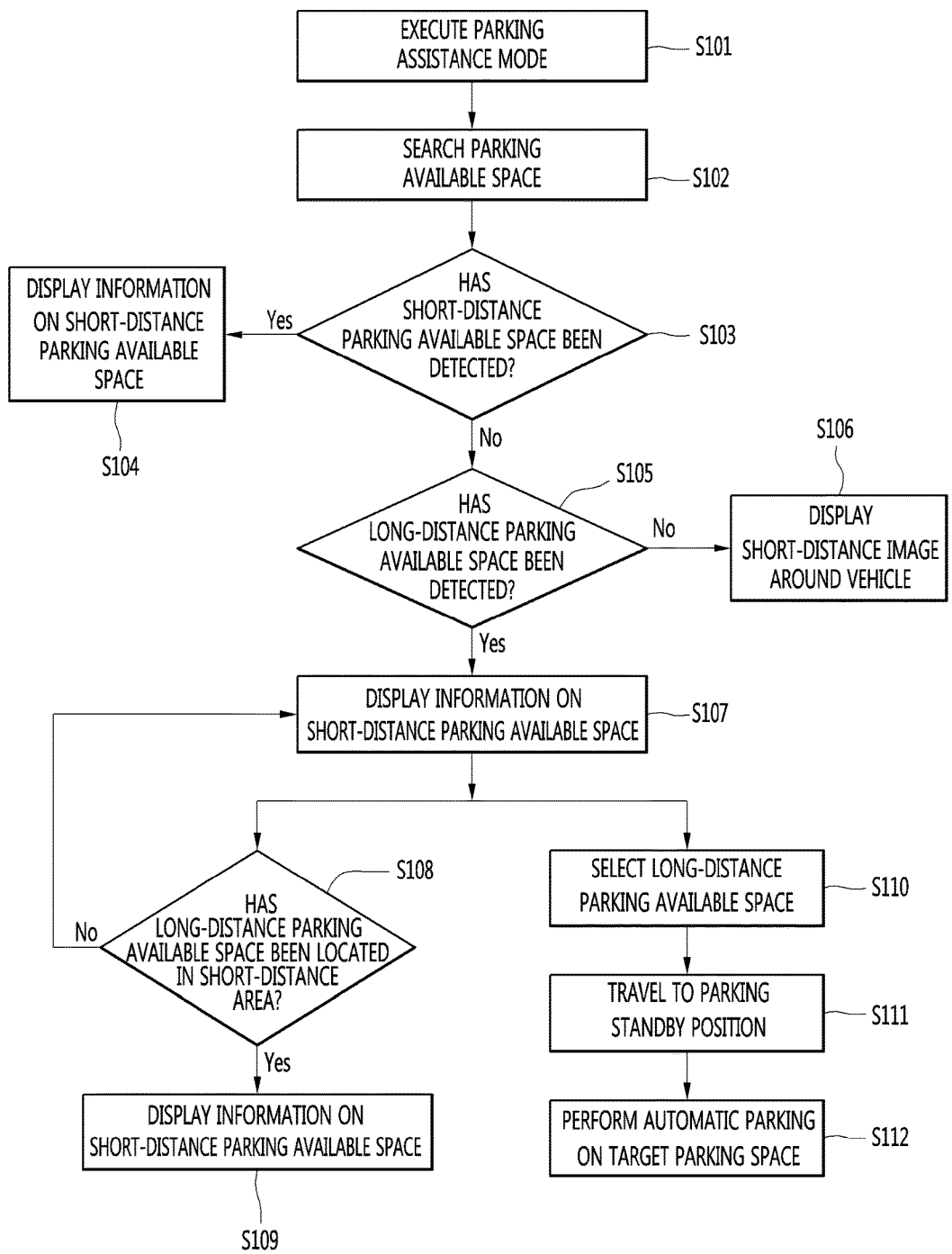
FIG. 8 is a flowchart illustrating an example of a parking assistance apparatus providing a parking assistance function according to some implementations.

Referring to FIG. 8, first, if a user's parking intention is detected, the parking assistance apparatus 100 may be activated to execute a parking assistance mode (S101).

In detail, if an input for executing the parking assistance function is received from the input unit 110, the processor 170 may execute the parking assistance function.

Also, the processor 170 may automatically execute the parking assistance mode by detecting the user's parking intention.

Figure 9A:
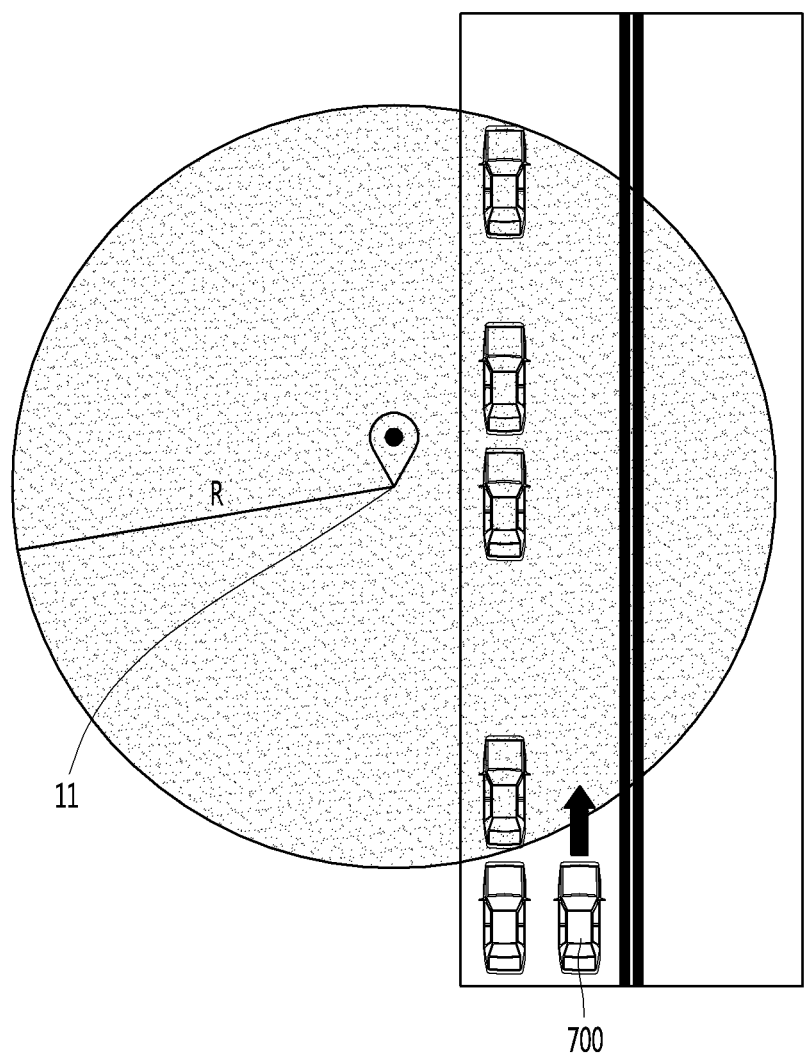
FIGS. 9A to 9C are diagrams illustrating examples of a situation in which the parking assistance function is automatically executed according to some implementations.

In detail, FIG. 9A, if it is detected from navigation information that the vehicle has entered within a predetermined radius R of a destination 11, the processor 170 may automatically execute the parking assistance function by considering that the user has a parking intention.

Figure 9B:
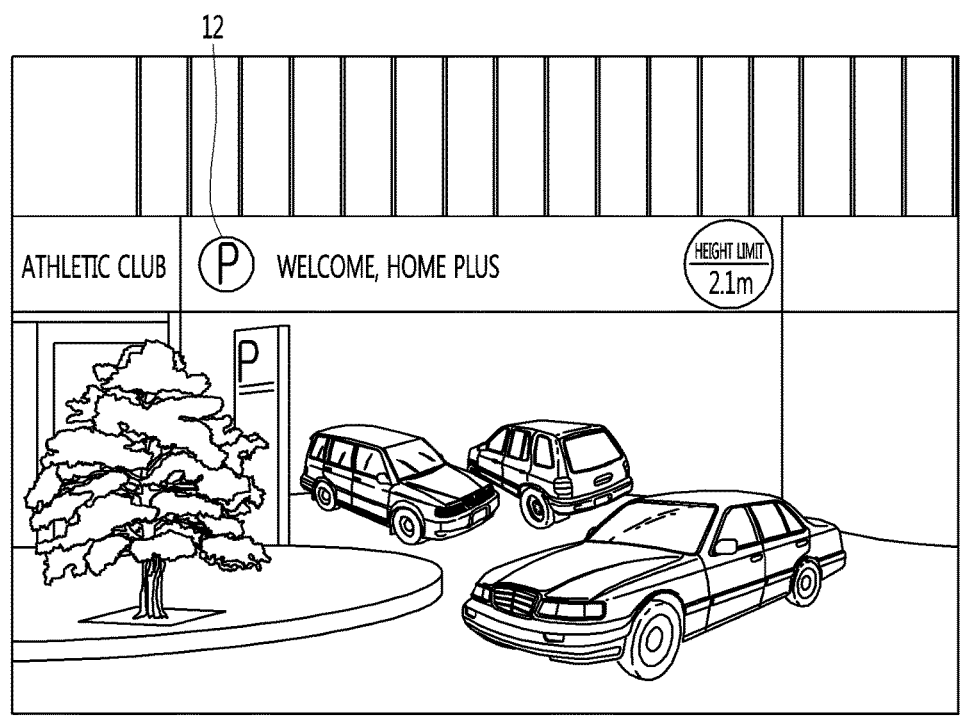

Referring to FIG. 9B, if a sign 12 representing a parking lot in an image photographed by the front stereo camera 160a is recognized, the processor 170 may automatically execute the parking assistance function by considering that the user has a parking intention.

Figure 9C:
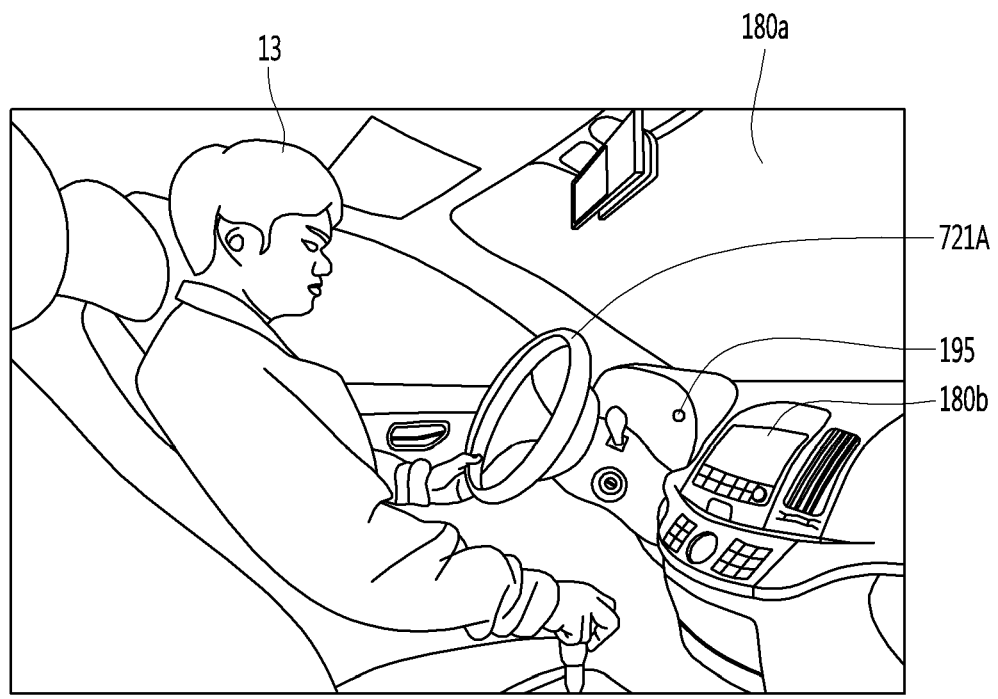

Referring to FIG. 9C, if a monitoring unit detects, from an image obtained by photographing the driver 13, the driver's parking intention such as detecting an action in which a driver looks around and, simultaneously, the vehicle travels at a predetermined speed or less for a certain time or more, the processor 170 may automatically execute the parking assistance function by considering that the user has a parking intention.

That is, the parking assistance apparatus 100 according to some implementations executes the parking assistance mode by detecting in advance the user's parking intention, so that it is possible to provide convenience to the user.

If the parking assistance mode is executed, the processor 170 may control the display unit 180 to display an around view image that is information on a short-distance environment around the vehicle.

Referring back to FIG. 8, if the parking assistance mode is executed, the processor 170 may search an available parking space using the sensor unit 155 (S102).

In detail, the processor 170 acquires information on a short-distance environment around the vehicle using the short-distance sensor 150, and detects a short-distance available parking space from the information on the short-distance environment around the vehicle (S103).

In an implementation, the short-distance sensor 150 may detect a short-distance available parking space in a manner that detects an empty space with a predetermined size or more from the around view image. More specifically, the processor 170 may detect parking lines from the around view image, and, if any object except a road surface (background) defined by the parking lines is not detected, detect the road surface as the available parking space.

If the short-distance available parking space is detected, the processor 170 may control the display unit 180 to display information on the short-distance available parking space (S104).

In detail, the processor 170 may display an around view image on the display unit 180, and further display a graphic image representing the short-distance available parking space on the around view image.

Meanwhile, the processor 170 may search an available parking space in a long-distance area LA while searching an available parking space in a short-distance area SA (S105).

Hereinafter, a method of detecting a long-distance available parking space in the long-distance area LA will be described in detail with reference to FIGS. 10 to 15.

Referring to FIG. 10, the processor 170 may search a long-distance available parking space from information on a long-distance environment around the vehicle, which is acquired by the long-distance sensor 160 (S201).

In detail, the processor 170 may detect an empty space having a predetermined size or more in a long-distance area LA, thereby detecting a long-distance available parking space (S202).

Figure 11:
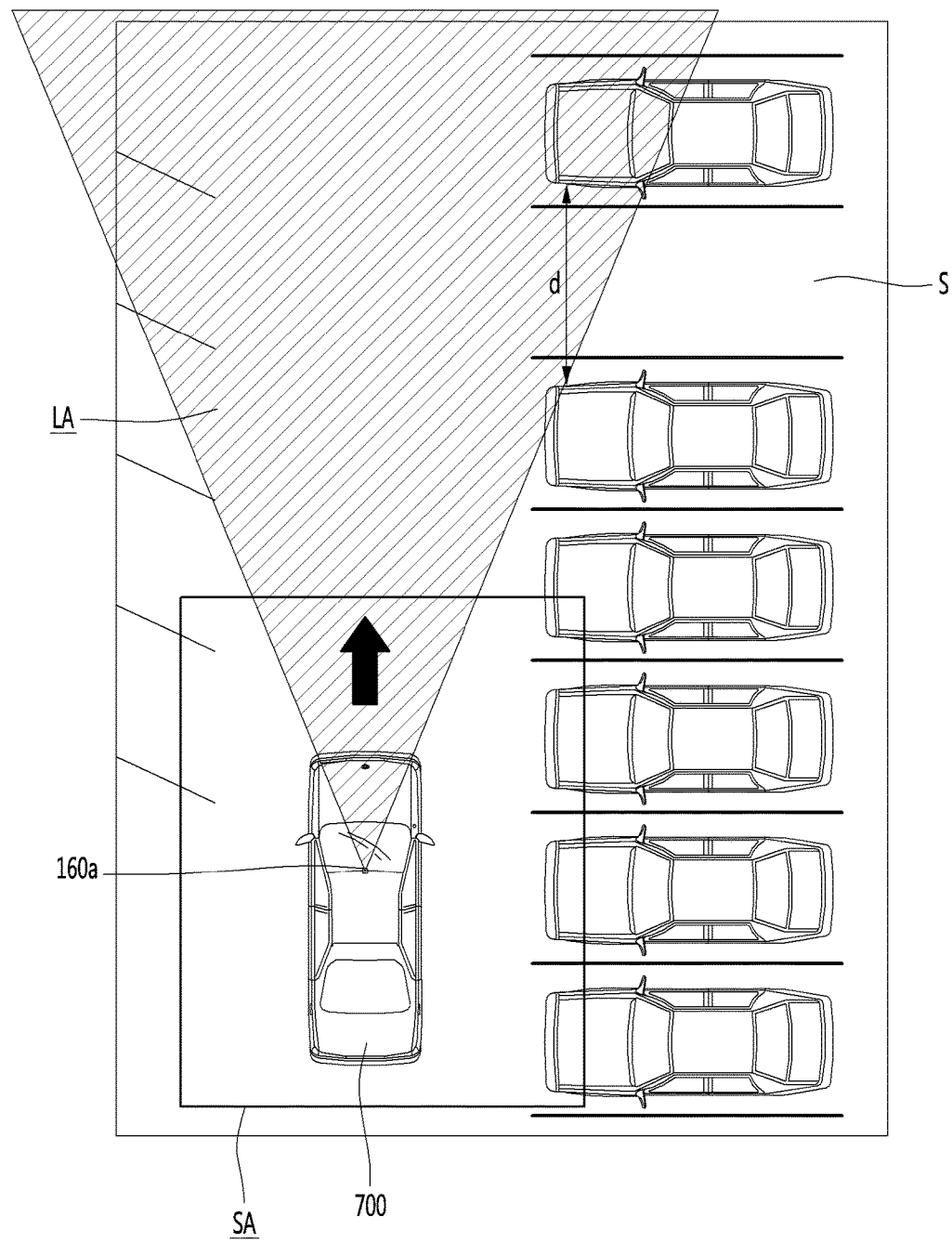
FIG. 11 is a diagram illustrating an example of a situation in which a long-distance available parking space is detected according to some implementations.

In detail, referring to FIG. 11, the processor 170 may acquire a front image through the front stereo camera 160a and measure a distance to an object included in the front image, thereby acquiring information on a long-distance environment around the vehicle.

In addition, if an empty space having a predetermined size or more is detected in an area defined by parking lanes or/and an area in which other vehicles are parked, the processor 170 may determine the detected empty space as a long-distance available parking space S.

In this case, the processor 170 may acquire, through an around view image, information on the area defined by the parking lines or the area in which the other vehicles are parked.

That is, the processor 170 may acquire information on an available parking area on the basis on information on a short-distance environment around the vehicle, and analyze the information on the long-distance environment around the vehicle on the basis of the acquired information, thereby detecting the long-distance available parking space S.

Figure 12:
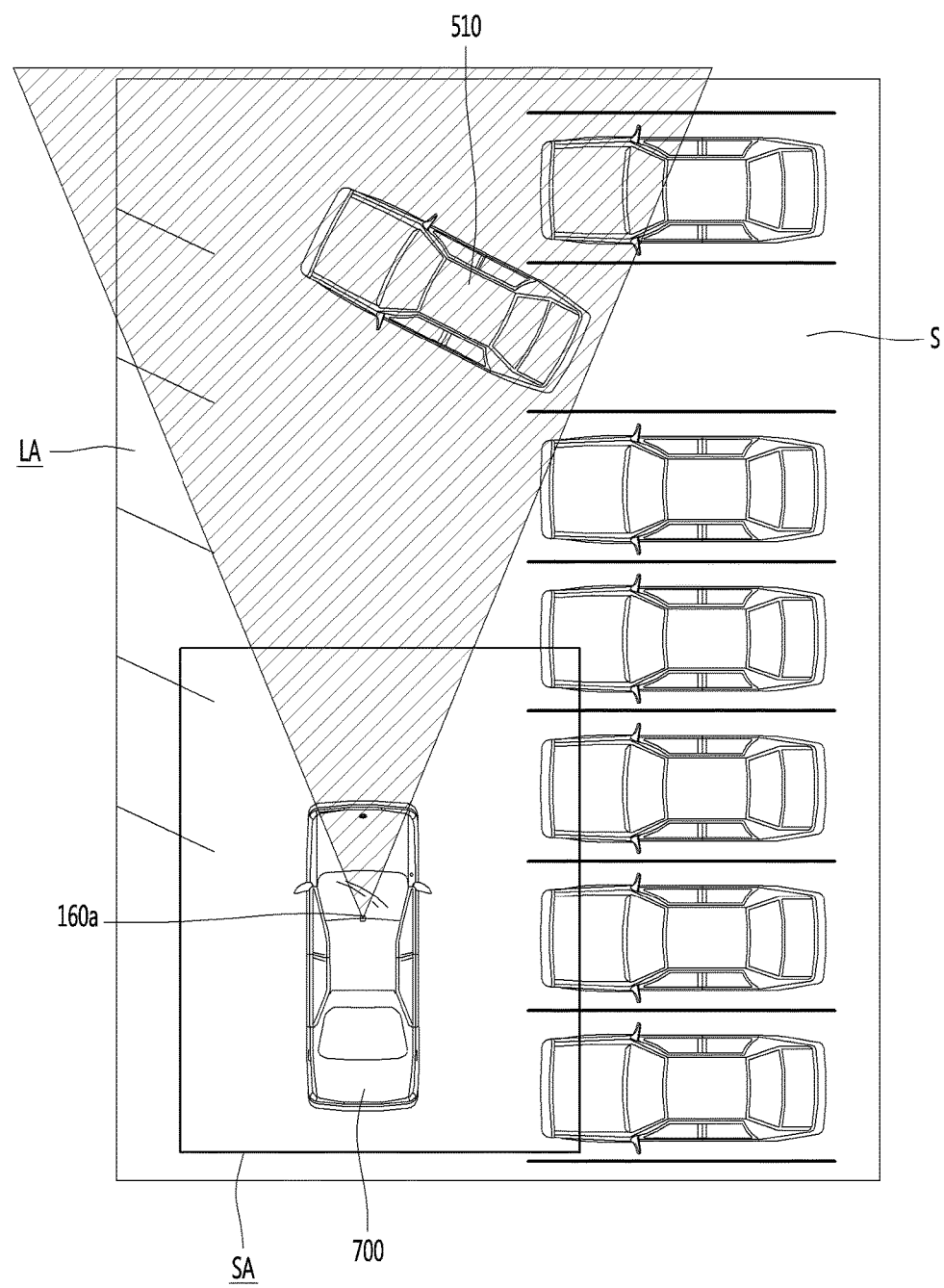
FIG. 12 is a diagram illustrating another example of a situation in which the long-distance available parking space is detected according to some implementations.

Referring to FIG. 12, if another vehicle 510 being taken out is detected from the information on the long-distance environment around the vehicle, the processor 170 may determine, as the long-distance available parking space S, a position of the other vehicle 510 before it is taken out (S203).

In detail, if another vehicle 510 being taken out of an available parking area is detected from an image of the front stereo camera 160, the processor 170 may detect, as the long-distance available parking space S, the available parking area of which the other vehicle 510 is taken out.

In more detail, the processor 170 may detect another vehicle 510 taken out of an area defined by parking lines or/and an area in which other vehicles 510 are parked, thereby detecting the long-distance available parking space S.

Figure 13:
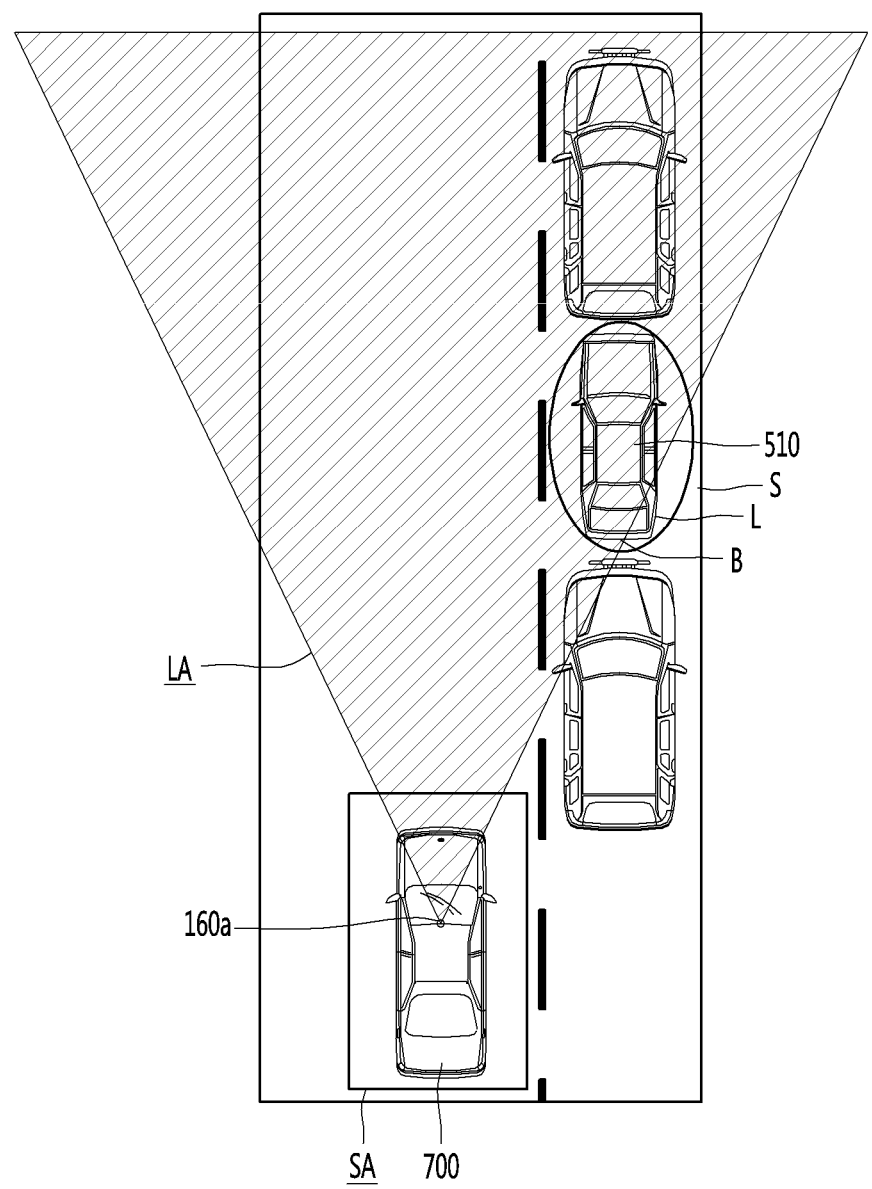
FIG. 13 is a diagram illustrating still another example of a situation in which the long-distance available parking space is detected according to some implementations.

Referring to FIG. 13, if another vehicle 510 to be taken out is detected from the information on the long-distance environment around the vehicle, the processor 170 may determine a position of the other vehicle 510 as the long-distance available parking space S (S204).

In detail, if another vehicle 510 showing a state of at least one of another vehicle 510 in which a person is riding, another vehicle 510 in which a brake lamp L is turned on, and another vehicle 510 in which an engine starting sound B is generated is detected from an image of the front stereo camera 160a, the processor 170 may determine the other vehicle in this state as another vehicle 510 to be taken out, and detect a position of the other vehicle 510 to be taken out as the long-distance available parking space S.

Meanwhile, if another vehicle 510 being taken out or another vehicle 510 to be taken out is detected, the processor 170 may calculate a size of the other vehicle 510 and compare the size of the other vehicle 510 with that of the vehicle 700, thereby determining whether the vehicle 700 is to be parked (S205).

In detail, if the size of the other vehicle 510 being taken out or the other vehicle 510 to be taken out is equal to or greater than a predetermined size, the processor 170 may determine a parking position of the corresponding vehicle 510 as the long-distance available parking space S.

The processor 170 may detect a long-distance parking space S in a side rear area LA from information on long-distance environments around the vehicle, which are acquired by the blind spot detection sensors 165a and 165b.

In detail, the processor 170 may detect the long-distance available parking space S in the side rear long distance area LA in a manner that detects an empty space having a predetermined size or more, i.e., at least one of another vehicle 510 being taken out and another vehicle 510 to be taken out, from information on side rear long-distance environments around the vehicle, which are acquired by the blind spot detection sensors 165a and 165b.

Figure 14:
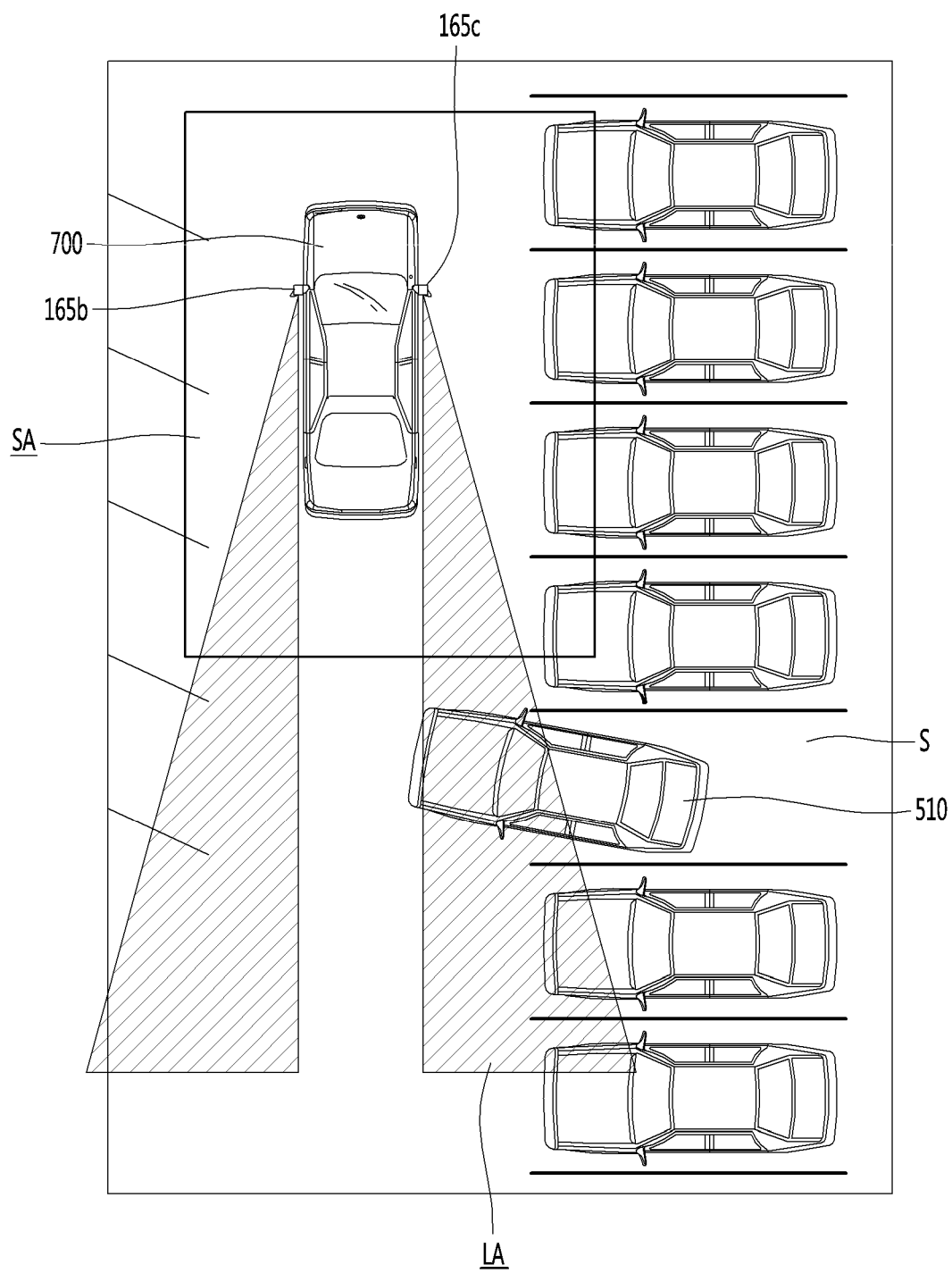
FIG. 14 is a diagram illustrating still another example of a situation in which the long-distance available parking space is detected according to some implementations.

Referring to FIG. 14, if another vehicle 510 being taken out of an available parking area is detected through the blind spot detection sensors 165*a* and 165*b*, the processor 170 may detect, as the long-distance available parking space S, a position of the available parking area of which the other vehicle 510 is taken out.

In more detail, the processor 170 may detect another vehicle 510 taken out of an area defined by parking lines or/and an area in which other vehicles 510 are parked, thereby detecting the long-distance available parking space S.

Meanwhile, the processor 170 may store, as a profile, information on a short-distance environment around the vehicle, acquired using the short-distance sensor 150, and detect a long-distance available parking space S through the stored profile.

Figure 15:
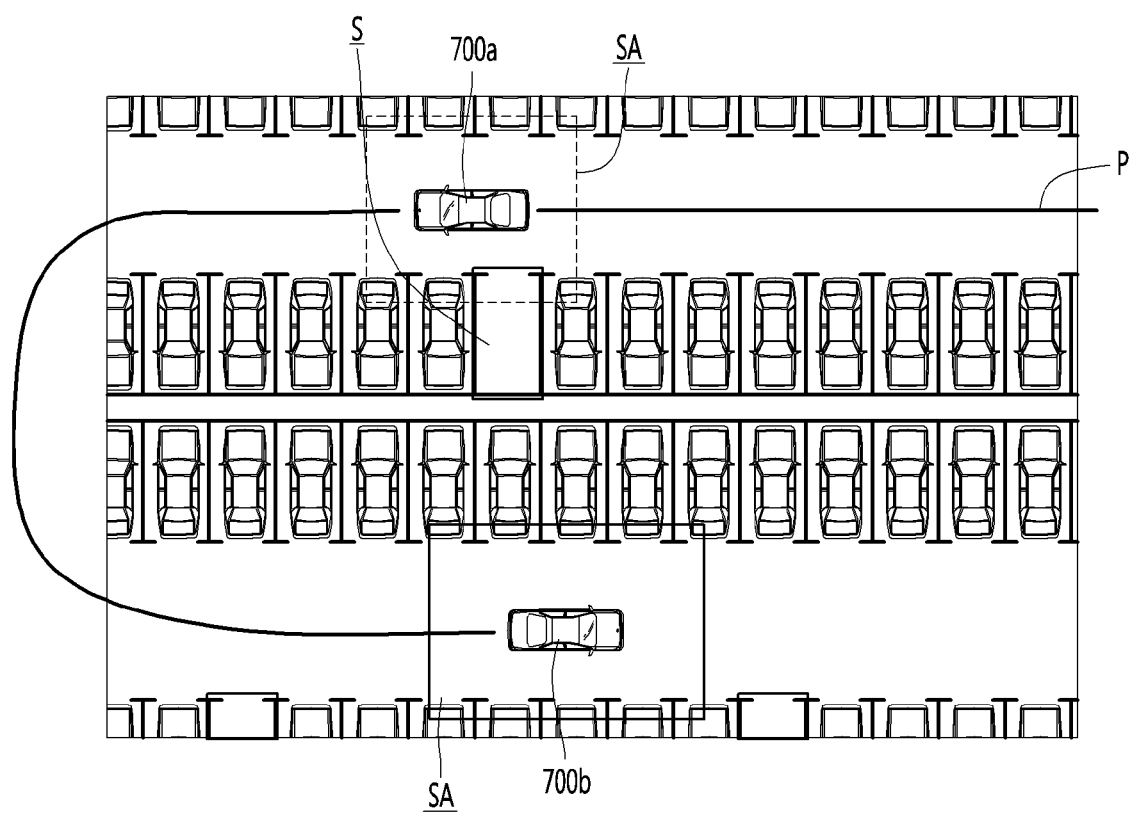
FIG. 15 is a diagram illustrating still another example of a situation in which the long-distance available parking space is detected according to some implementations.

In detail, referring to FIG. 15, the processor 170 may store photographed information on a short-distance environment around the vehicle. In some implementations, the photographed information may include continuously-photographed information. Also, the processor 170 may store information on a short-distance available parking space, which is detected from the photographed information. If an available parking space detected from information on the short-distance environment around a vehicle 700*a* as the vehicle 700*a* travels is out of a short-distance area SA of a current vehicle 700*b*, the processor 170 may detect a long-distance available parking space S in a manner that sets an available parking space out of the short-distance area SA as the long-distance available parking space S.

As described above, the parking assistance apparatus 100 according to some implementations may detect, in various manners, the long-distance available parking space S located in the long-distance area LA (S206).

Referring back to FIG. 8, if any long-distance available parking space S is not detected, the processor 170 may control the display unit 180 to maintain the display of the around view image (S106).

If a long-distance available parking space S is detected, the processor 170 may control the display unit 180 to display information on the detected long-distance available parking space S (S107).

That is, if the long-distance available parking space S is detected, the processor 170 may control the display unit 180 to display a graphic user interface (GUI) for performing automatic parking on the long-distance available parking space S.

In detail, the processor 170 may provide the GUI in a manner that displays an image at a point of time when the long-distance available parking space S can be viewed and a graphic image designating the long-distance available parking space.

Figure 16:
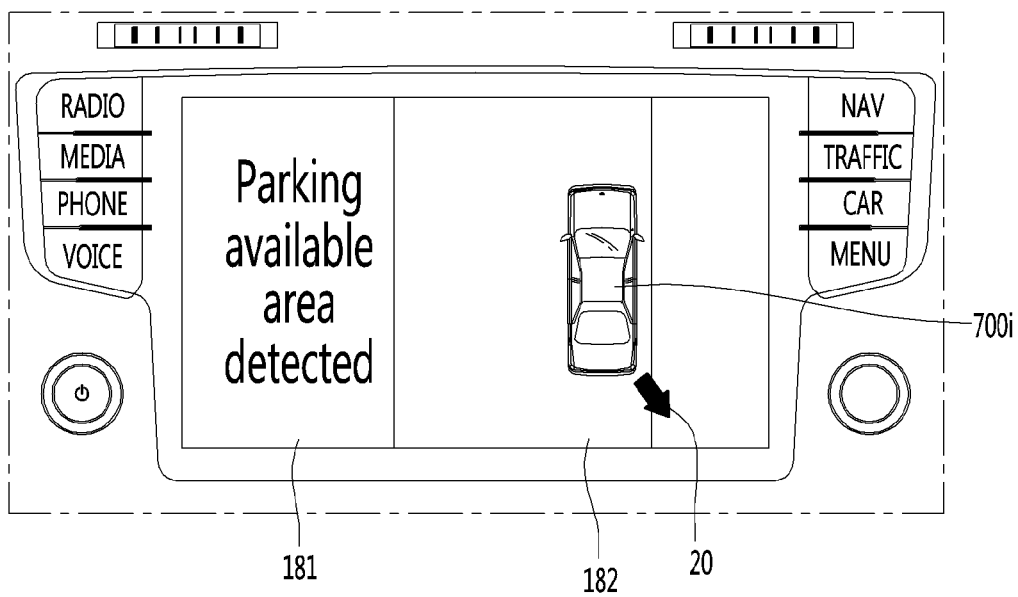
FIG. 16 is a diagram illustrating an example of a display screen in a state in which a long-distance available parking space is detected according to some implementations.
Figure 17:
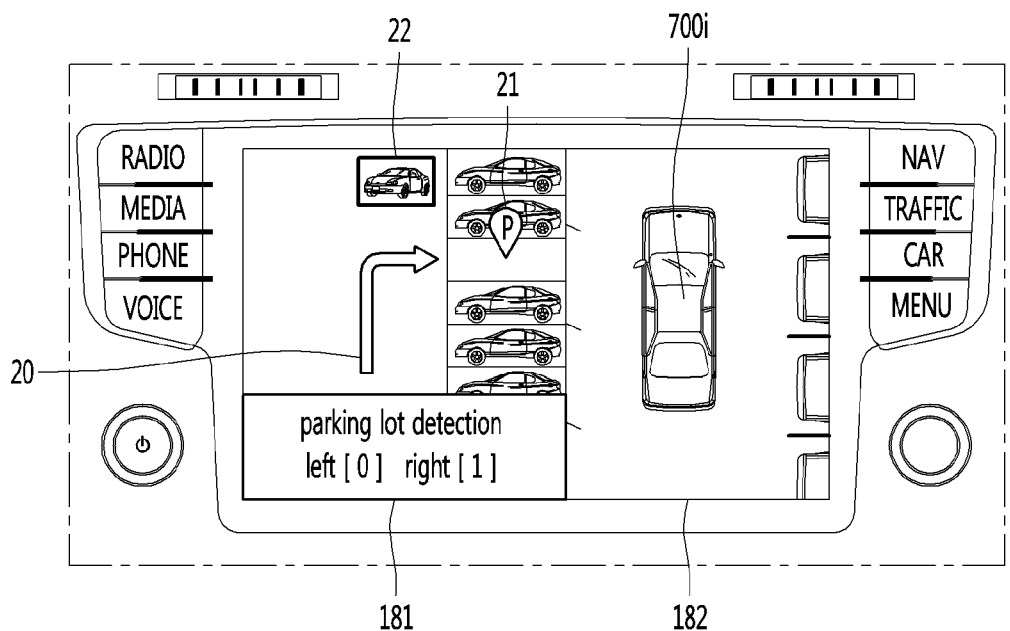
FIG. 17 is a diagram illustrating another example of the display screen in a state in which the long-distance available parking space is detected according to some implementations.

Referring to FIG. 16, the second display 180*b* of the display unit 180 is divided into a first display area 181 and a second display area 182, and a front image representing a long-distance available parking space S may be displayed on the first display area 181. In this case, at least one of a navigation image 20 guiding a route up to a position of the long-distance available parking space S, a target designating image 21 displaying the position of the long-distance available parking space S, and a taking-out vehicle display image 22 highlighting another vehicle 510 being taken out may be further displayed in the front image.

Also, an around view image may be displayed on the second display area 182.

The display unit 180 includes the first display unit 180*a* for displaying graphic images on the windshield of the vehicle, and the windshield display 180*a* may display an augmented reality graphic image designating an available parking space.

Figure 18:
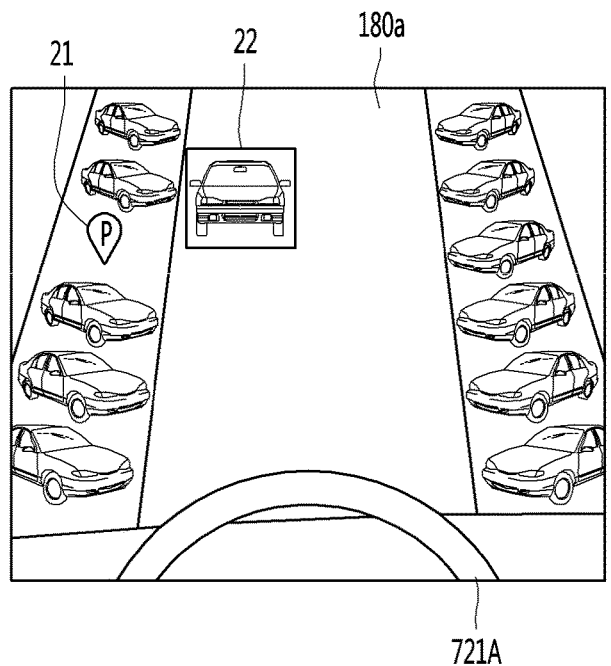
FIG. 18 is a diagram illustrating still another example of the display screen when the long-distance available parking space is detected according to some implementations.

Referring to FIG. 18, the first display unit 180*a* may provide information on the long-distance available parking space S, by displaying, on the windshield, at least one of a navigation image guiding a route up to a position of the long-distance available parking space S, a target designating image 21 displaying the position of the long-distance available parking space S, and a taking-out vehicle display image 22 highlighting another vehicle 510 being taken out.

Meanwhile, when the long-distance available parking space S is detected from the information on the short-distance environment, stored as the profile, the processor 170 may provide a scroll GUI for displaying short-distance images that were photographed in the past according to a user scroll input.

Figure 19A:
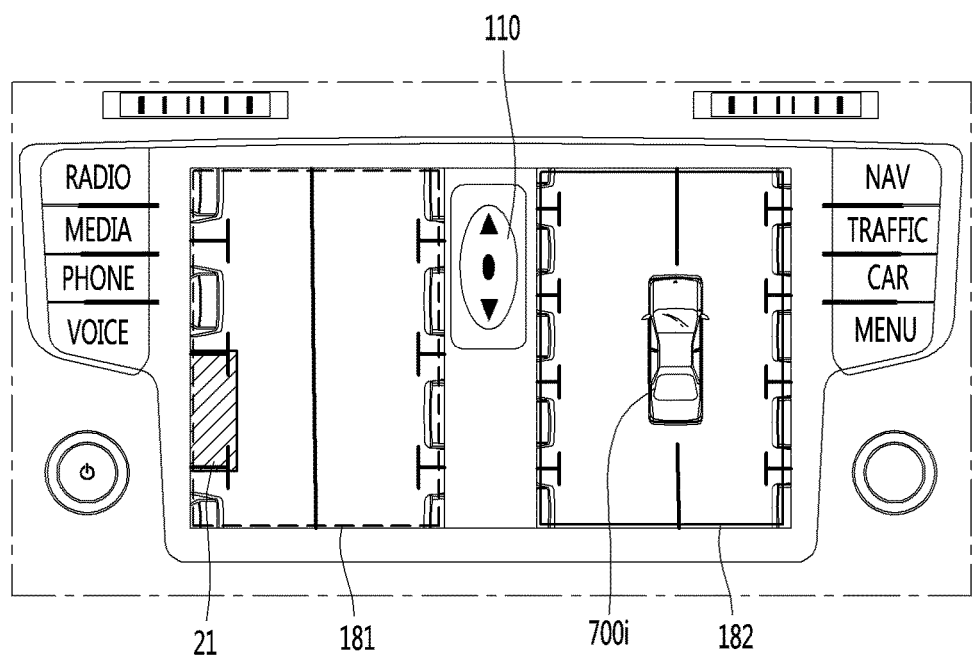
FIGS. 19A and 19B are diagrams illustrating still another examples of the display screen when the long-distance available parking space is detected according to some implementations.

In detail, referring to FIG. 19A, a screen of the display unit 180 is divided into a first display area 181 and a second display area 182. A past around view image may be displayed on the first display area 181, and a current around view image may be displayed on the second display area 182. In this case, an image of a scroll input unit configured to change a point of time of the past around view image may be further displayed on the screen of the display unit 180, and a user may change the past around view image displayed on the screen of the display unit 180 through the scroll input unit.

Figure 19B:
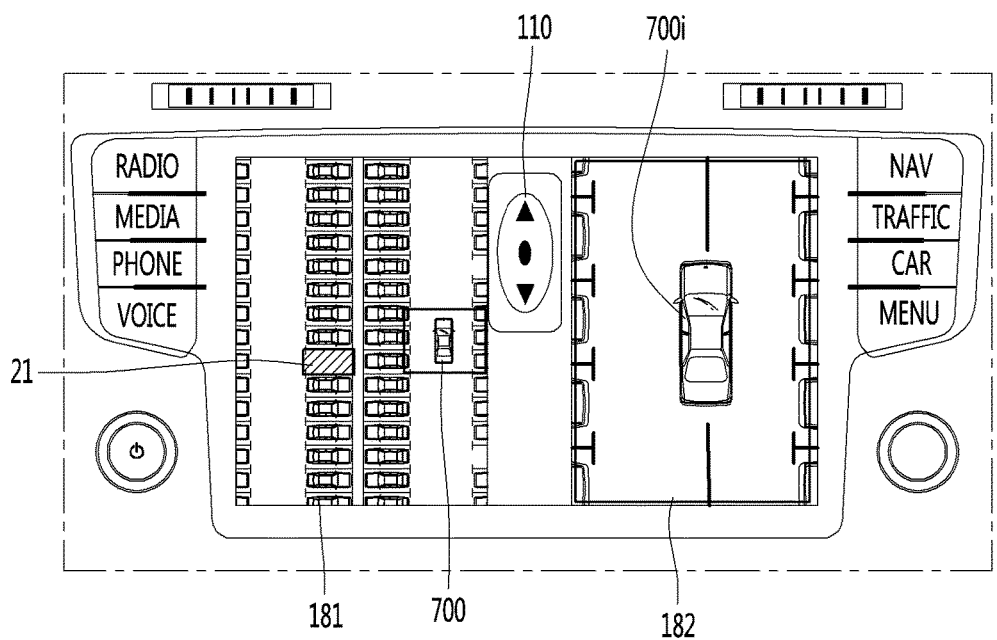

Referring to FIG. 19B, a screen of the display unit 180 is divided into a first display area 181 and a second display area 182. A birds-eye view image configured to display a long-distance available parking space S may be displayed on the first display area 181, and an around view image may be displayed on the second display area 182.

In detail, the processor 170 may control the display unit 180 to create a virtual map by synthesizing information on previous environments around the vehicle and to display a birds-eye view image by adding, to the virtual map, a graphic image representing an available parking space on the virtual map.

Alternatively, the processor 170 may control the display unit 180 to receive a parking lot map through the communication unit 120 and to display a birds-eye view image by adding, to the received map, a graphic image representing an available parking space on the received map.

As described above, the parking assistance apparatus 100 can effectively provide the user with information on short-distance/long-distance available parking spaces detected through the above-described various graphic user interfaces. Also, the parking assistance apparatus 100 can assist the user to easily set the parking assistance function.

Meanwhile, if it is detected that the detected long-distance available parking space S has been located in the short-distance area SA as the vehicle moves, the processor may non-activate the display of the information on the long-distance environment around the vehicle, display an around view image, and then display information on an available parking space in the around view image (S108 and S109).

Meanwhile, the processor 170 may receive, through the input unit 110, an input notifying that the user is to perform automatic parking on the long-distance available parking space S (S110).

That is, the user may set the long-distance available parking space S as a target parking space by touching the target designating image 21 of the long-distance available parking space S. If such a setting input is received, the processor 170 may perform the automatic parking on the selected long-distance available parking space S.

Meanwhile, if a plurality of available parking spaces are detected, the processor 170 may evaluate the available parking spaces through at least one criteria and automatically set one of the plurality of available parking spaces as the target parking space based on the at least one criteria.

For example, the processor 170 may automatically determine, as the target parking space, an available parking space located at the shortest distance from the entrance of a destination. Alternatively, the processor 170 may automatically determine, as the target parking space, an available parking space located at the shortest distance from the position of a current vehicle.

If the target parking space is set, the processor 170 may first design a route for performing parking on the long-distance available parking space S.

If the long-distance available parking space S is detected through another vehicle being taken out or another vehicle 510 to be taken out, the processor 170 may design such that a parking standby position is included in the route (S111).

Figure 20A:
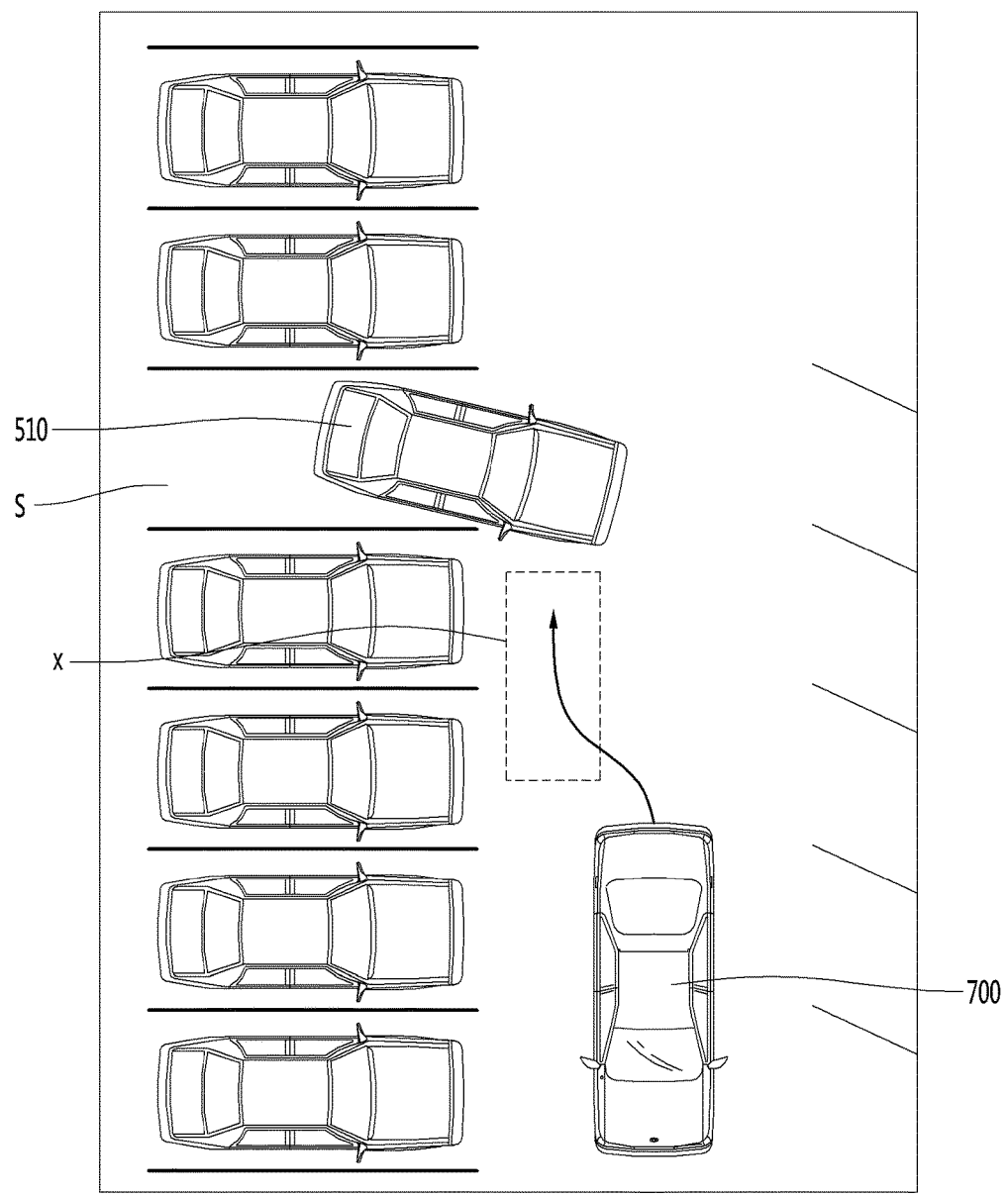
FIG. 20A is a diagram illustrating an example of a process in which a vehicle is automatically parked in a long-distance available parking space according to some implementations.

Referring to FIG. 20A, the processor 170 may determine a parking standby position X around the detected available parking space, control the vehicle 700 to move at the parking standby position X while another vehicle 510 is being taken out, and control the vehicle 700 to stop at the parking standby position X until a point of time when the taking-out of the other vehicle 510 is completed. In this case, the parking standby position X may be selected as a position that is closest to the target parking space while not interfering with the taking-out of the other vehicle 510.

Figure 20B:
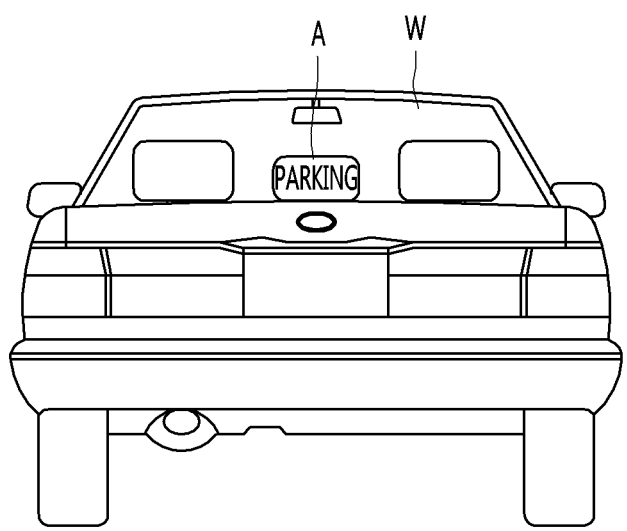
FIG. 20B is a diagram illustrating an example of a rear of the vehicle being parked the long-distance available parking space according to some implementations.

Meanwhile, the processor 170 may control the vehicle 700 to notify the outside that the vehicle 700 is being parked, while automatic parking is being performed on the target parking space. In detail, the processor 170 may transmit, through the communication unit 120, a signal notifying other vehicles located around the vehicle 700 that the vehicle 700 is being parked. Referring to FIG. 20B, the processor 170 may control display unit 180 to display an image A representing "PARKING" on a rear windshield W of the vehicle 700, thereby notifying other vehicles that the vehicle 700 is being parked.

Finally, the processor 170 may perform automatic parking for allowing the vehicle 700 to move into the target parking space (S112).

As described above, the parking assistance apparatus 100 can detect an available parking space in a long-distance area LA out of a short-distance area SA. Also, the parking assistance apparatus 100 can provide information on the detected long-distance/short-distance available parking spaces through an effective graphic user interface. Also, when a long-distance available parking space is selected, the parking assistance apparatus 100 enables the vehicle 700 to perform automatic parking on the long-distance available parking space S.

The parking assistance apparatus 100 can more accurately and quickly detect an available parking space by simultaneously using the short-distance sensor 150 and the long-distance sensor 160.

In detail, when the short-distance sensor 150 is an image sensor and the long-distance sensor 160 is a distance measuring sensor, the processor 170 can more accurately determine an available parking space by simultaneously using image information and distance information.

Figure 21:
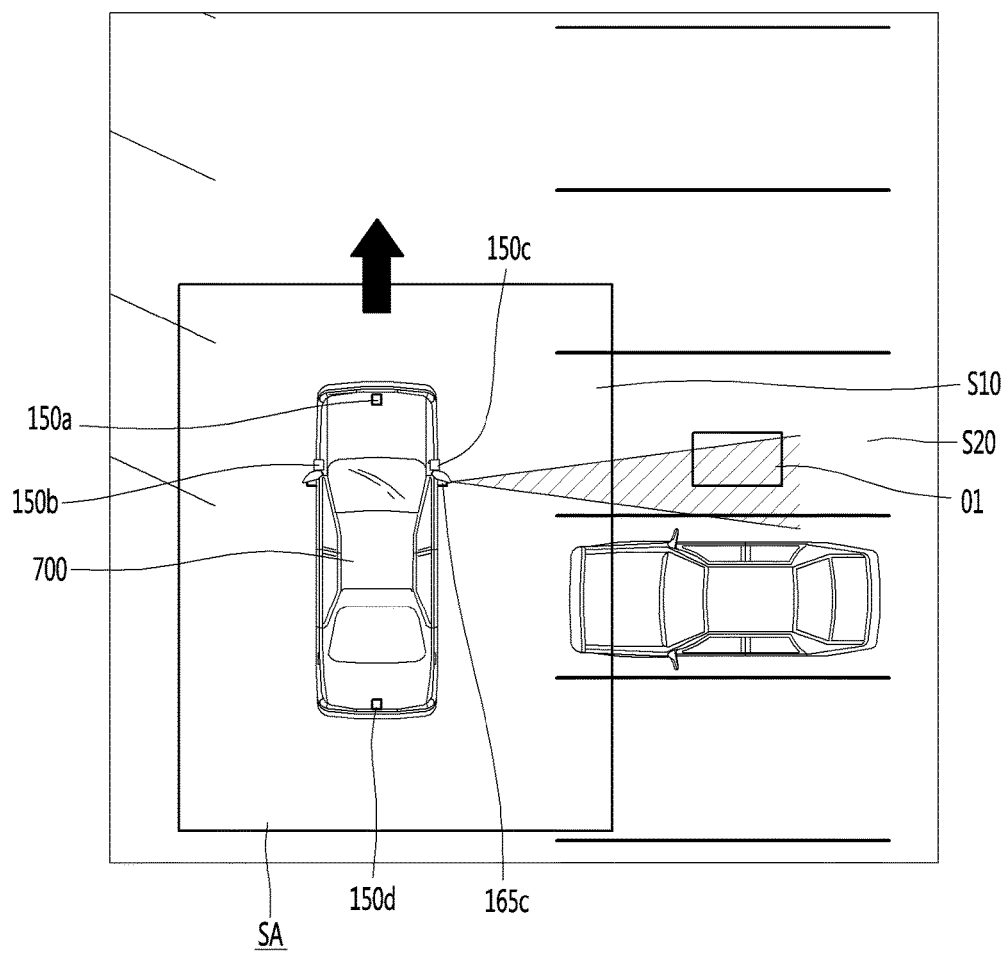
FIG. 21 is a diagram illustrating an example of a state in which an available parking space is detected using a plurality of sensors according to some implementations.

Referring to FIG. 21, if an obstacle 01 in an available parking space S20 is detected through a distance measuring sensor 165c even when a space between parking lines, in which no another vehicle 510 is located, is detected as an available parking space S10 through image information of an image sensor 150b, the processor 170 may determine the available parking space S10 as a parking impossible space. In detail, if the area S10 between the parking lines, in which no another vehicle 510 is located, is detected from an around view image, the processor 170 may determine the area S10 as an available parking space. However, if the obstacle 01 having a predetermined size or more is detected in the available parking space 20 through distance measurement information, the processor 170 may determine the available parking space S10 as a parking impossible space.

That is, since the image information is 2D information and the distance measurement information is 3D information, the processor 170 can more accurately determine an available parking space by simultaneously using the image information and the distance measurement information.

In this case, the processor 170 may control the display unit 180 to further display information on the area determined as the parking impossible space.

Figure 22:
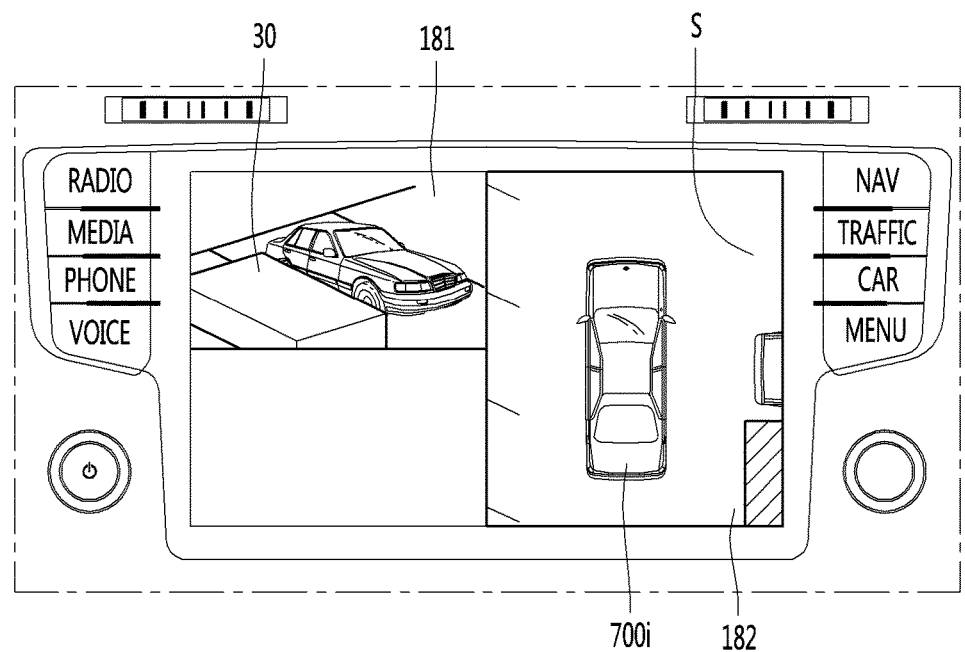
FIG. 22 is a diagram illustrating an example of another state in which the available parking space is detected using the plurality of sensors according to some implementations.

In detail, referring to FIG. 22, a screen of the display unit 180 is divided into a first display area 181 and a second display area 182. An image at a point of time when an obstacle that causes the determination of a parking impossible space is displayed may be displayed on the first display area 181, and an around view image may be displayed on the second display area 182. The display of a graphic image representing an available parking space may be deleted at the position of the parking impossible space.

Figure 23:
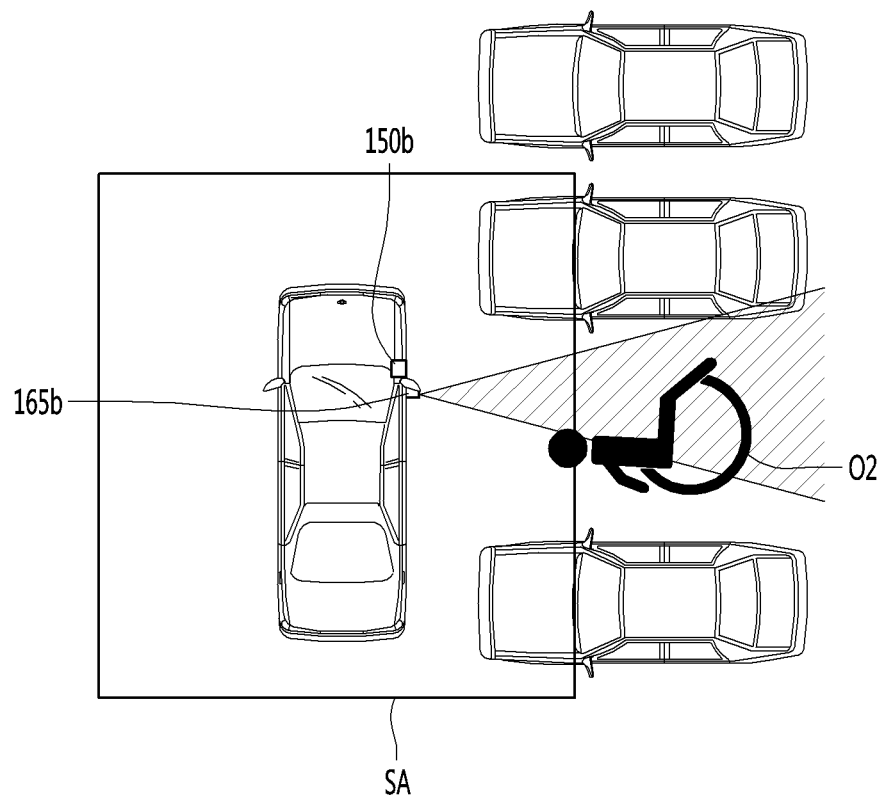
FIG. 23 is a diagram illustrating an example of a display screen displaying a space detected using the plurality of sensors according to some implementations.

On the contrary, referring to FIG. 23, if an available parking space is detected through the distance measuring sensor 165c, and a parking restriction sign 02 is then detected in the available parking space through the image sensor 150b, the processor 170 may determine the available parking space as a parking impossible space. In detail, if an empty space having a predetermined size or more is detected from the distance information, the processor 170 may determine the detected space as an available parking space. However, if the parking restriction sign 20 such as a disabled available parking sign, a women available parking sign, or a residential available parking sign is detected from the image information, the processor 170 may determine the available parking space as a parking impossible space.

Meanwhile, if parking spaces exist at both sides of the vehicle, the parking assistance apparatus 100 may search an available parking space at one side of the vehicle through the short-distance sensor 150 and search an available parking space at the other side of the vehicle through the long-distance sensor 160.

In detail, the processor 170 may detect that parking spaces are located at both sides in the advancing direction of the vehicle 700 and calculate whether the width between both the parking spaces is equal to or greater than a predetermined width. That is, the processor 170 may determine that both the parking spaces cannot be simultaneously measured through the short-distance sensor 150. For example, the processor 170 may determine that left and right parking spaces cannot be simultaneously displayed in an around view image because the width between both the parking spaces is equal to or greater than a predetermined length related to the width of a short-distance area SA.

If both the sides of the vehicle cannot be detected through the short-distance sensor 150, the processor 170 may scan an available parking space at one side of the vehicle through the short-distance sensor 150 and scan an available parking space at the other side of the vehicle through the long-distance sensor 160.

Figure 24:
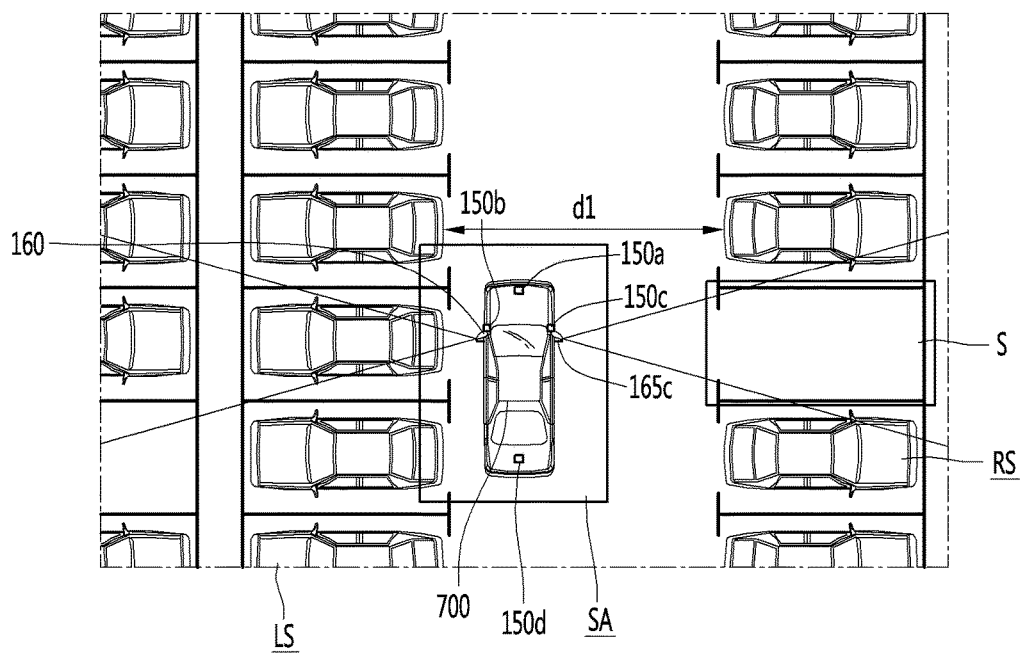
FIG. 24 is a diagram illustrating an example of a state in which left and right available parking spaces of the vehicle are detected using the plurality of sensors according to some implementations.

Referring to FIG. 24, an available parking space may be searched in a left parking area LS using the short-distance sensor 150, and an available parking space may be searched in a right parking area RS using the long-distance sensor 160. In this case, the processor 170 may control the vehicle 700 to travel closer to a left side at which the short-distance sensor measures than a right side at which the long-distance sensor 160 measures.

That is, the processor 170 may control the AVM cameras 150a, 150b, 150c, and 150d to detect an available parking space in the left parking area LS, and control the blind spot detection sensors 165a and 165b to detect an available parking space in the right parking area RS.

Hereinafter, the GUI provided in the parking assistance apparatus 100 will be described in detail with reference to FIGS. 25 to 29.

First, if a long-distance available parking space S is detected, the parking assistance apparatus 100 may display a GUI providing information on the long-distance available parking space S.

Figure 25:
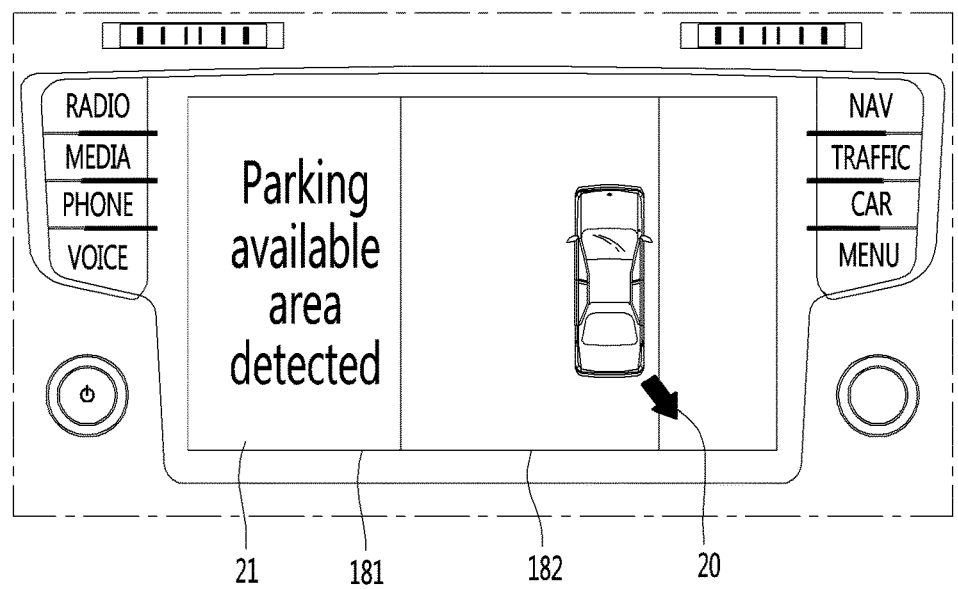
FIGS. 25 to 27 are diagrams illustrating examples of a display screen when a long-distance available parking space is detected according to some implementations.

Referring to FIG. 25, a screen of the display unit 180 is divided into a first display area 181 and a second display area 182. Information that a long-distance available parking space S has been detected may be displayed on the first display area 181, and an around view image may be displayed on the second display area 182. That is, if a long-distance available parking space S is detected, the display unit 180 may display, as a popup, information that the long-distance available parking space S has been detected.

In this case, a navigation image 20 guiding a position of the long-distance available parking space S is further displayed in the around vie image, to guide the position of the long-distance available parking space S to the user.

Figure 26:
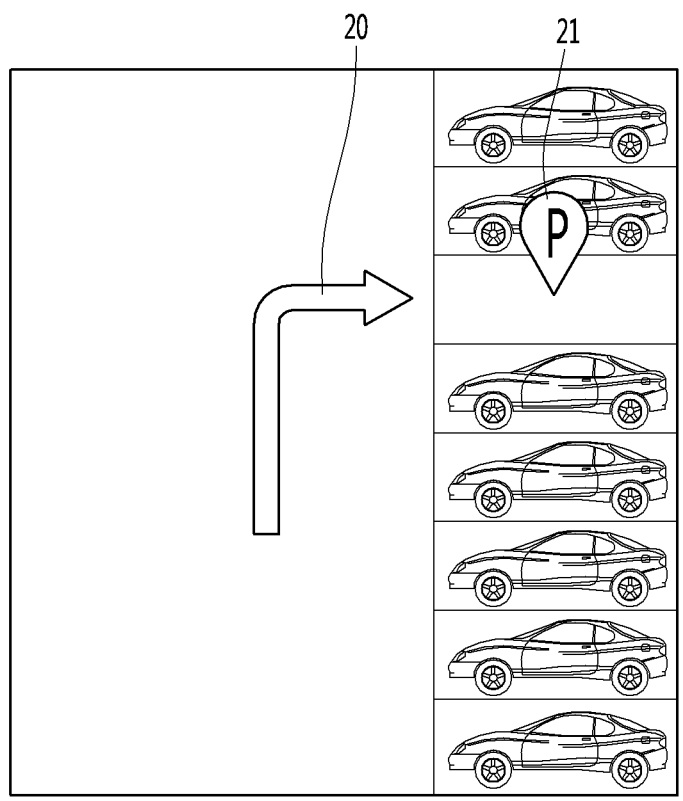

Referring to FIG. 26, the display unit 180 displays an image at a point of time when a long-distance available parking space S is detected, and may further display at least one of a navigation image 20 guiding a route up to a position of the long-distance available parking space S, a target designating image 21 displaying the position of the long-distance available parking space S, and a taking-out vehicle display image 22 highlighting another vehicle 510 being taken out.

Figure 27:
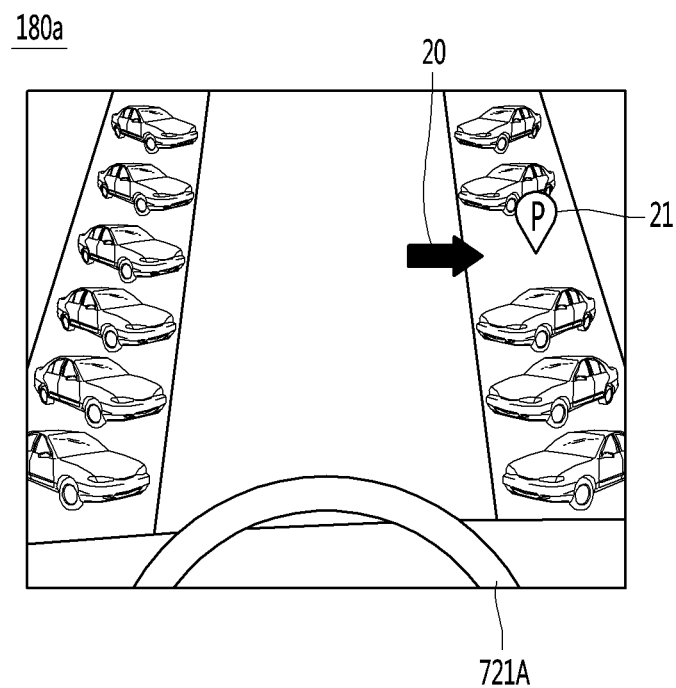

Referring to FIG. 27, the display unit 180 may provide information on a long-distance available parking space by displaying, on the windshield display 180a, at least one of a navigation image 20 guiding a route up to a position of the long-distance available parking space S, a target designating image 21 displaying the position of the long-distance available parking space S, and a taking-out vehicle display image 22 highlighting another vehicle 510 being taken out.

Meanwhile, as the location relationship between the vehicle and a target parking space is changed due to movement of the vehicle, the processor 170 may change the position of the target designating image 21 in the around view image.

Figure 28:
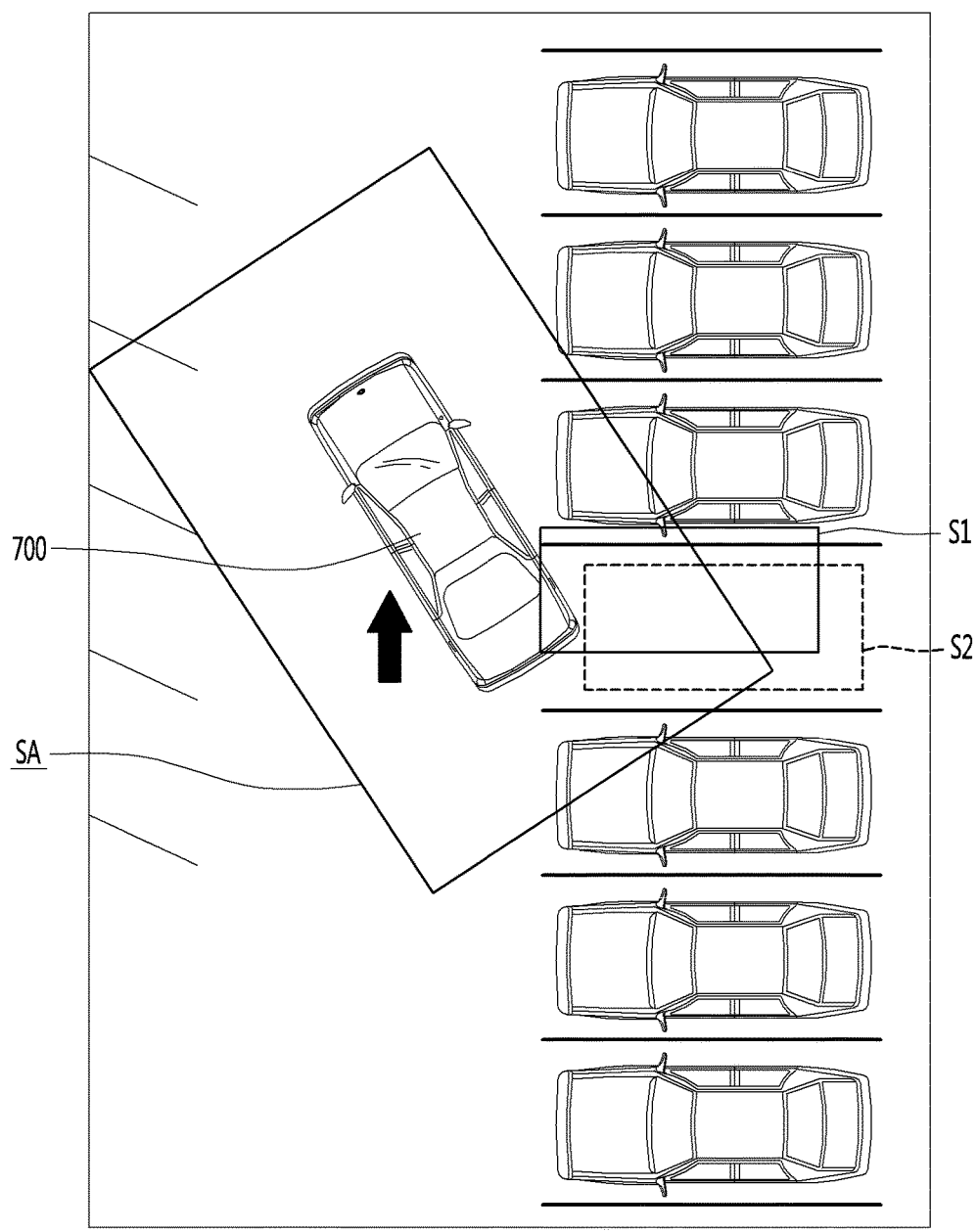
FIG. 28 is a diagram illustrating an example of a state in which a target parking space is corrected during automatic parking according to some implementations.

In detail, referring to FIG. 28, when the distance between the vehicle and a target parking space is distant, the processor 170 may calculate an accurate position of the target parking space as a first position S1 that is not accurate. However, as the vehicle gradually comes close to the target parking space, the processor 170 may detect the position of the target parking space as a second position S2 that is accurate.

Thus, the processor 170 can continuously scan the position of the target parking space using the short-distance sensor 150 and the long distance sensor 160, and continuously correct the position of an image displaying the target parking space on the display unit 180.

Figure 29:
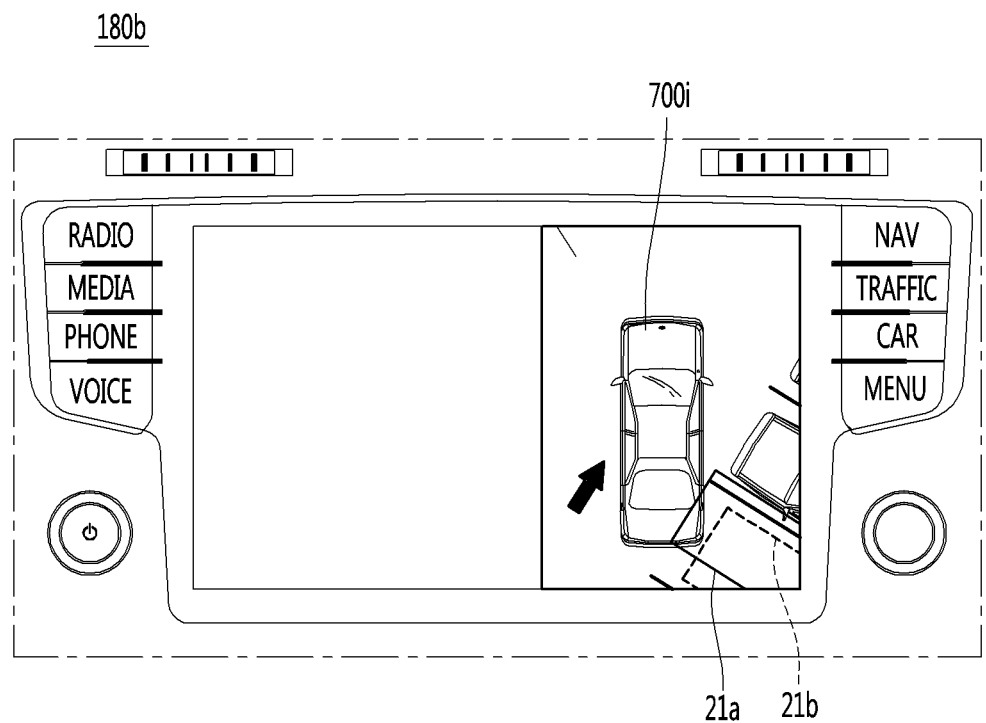
FIG. 29 is a diagram illustrating an example of a change in display screen when the target parking space is corrected during the automatic parking according to some implementations.

Referring to FIG. 29, the display unit 180 may display a target designating image 21a at a position of an around view image, matched to an initial first position. Then, as the position of a target parking space is corrected, the display 180 may a target designating image 21b at a position of the around view image, matched to a corrected second position.

Meanwhile, the parking assistance apparatus 100 may provide a shoulder parking mode in which it automatically performs shoulder parallel parking in which an inexperienced driver has difficulty.

If the shoulder parking mode is executed, the processor 170 may detect situations around roads and lanes using an image sensor, thereby searching a parking direction and an available parking space. For example, when a shoulder parking line is a white solid line, the processor 170 may determine that shoulder parking is possible. In addition, when the shoulder parking line is a yellow double solid line, the processor 170 may determine that the shoulder parking is impossible.

If it is determined that the shoulder parking is possible, the processor 170 may search a target parking space. At this time, the shoulder parking mode is different from the existing parking assistance mode in not that an available parking space selected among searched available parking spaces is set to the target parking space but that an available parking space that can be detected as fast as possible is automatically set to the target parking space.

If the target parking space is detected, the processor 170 may calculate an area to which the vehicle is movable to perform parking, and differently design a route for automatic parking depending on an area of the movable area.

Figure 30A:
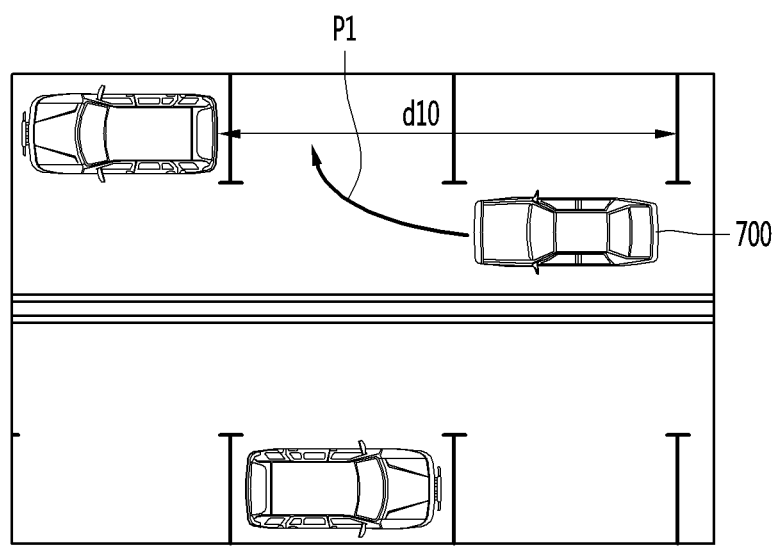
FIGS. 30A and 30B are diagrams illustrating examples of comparing states in which routes are differently designed as sizes of target parking spaces are different from each other.

For example, referring to FIG. 30A, if when parallel parking is performed, the length d10 of a target parking space and a front/rear space of the target parking space is equal to or greater than a predetermined length, automatic parking may be performed along a forward parallel parking route P1. In detail, if an empty space is a space in which at least two vehicles can be parked, the processor 170 may design a forward parallel parking route P1 and perform automatic parking along the forward parallel parking route P1.

Figure 30B:
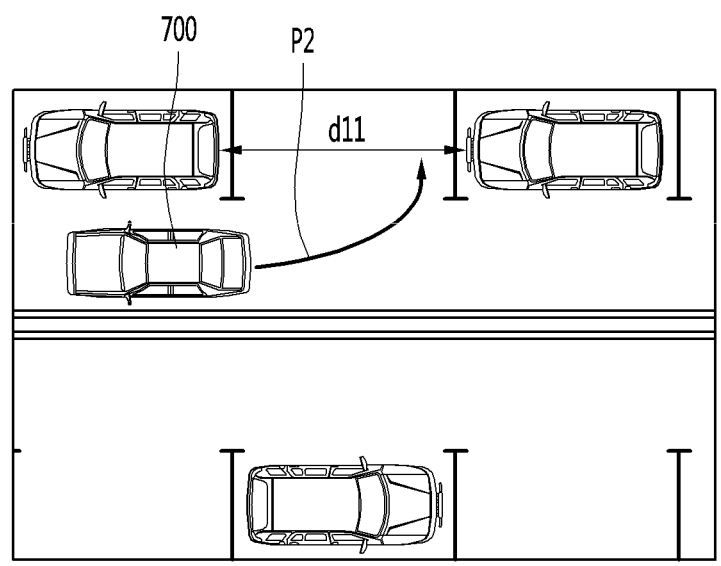

On the contrary, referring to FIG. 30B, if another vehicle 510 exists in a target parking space and a front/rear space of the target parking space, automatic parking may be performed along a backward parallel parking route P2.

Also, the processor 170 may differently design a parking route depending on whether there exists another vehicle 510 following the vehicle 700.

In detail, when another vehicle exists at the rear of the vehicle 700, the processor 170 may perform automatic parking along a forward parallel parking route. When no another vehicle exists at the rear of the vehicle 700, the processor 170 may perform automatic parking along a backward parallel route.

As described above, the parking assistance apparatus 100 provides the shoulder parking mode in which it automatically performs shoulder parallel parking in which drivers have difficulty, thereby improving user's convenience.

Figure 31:
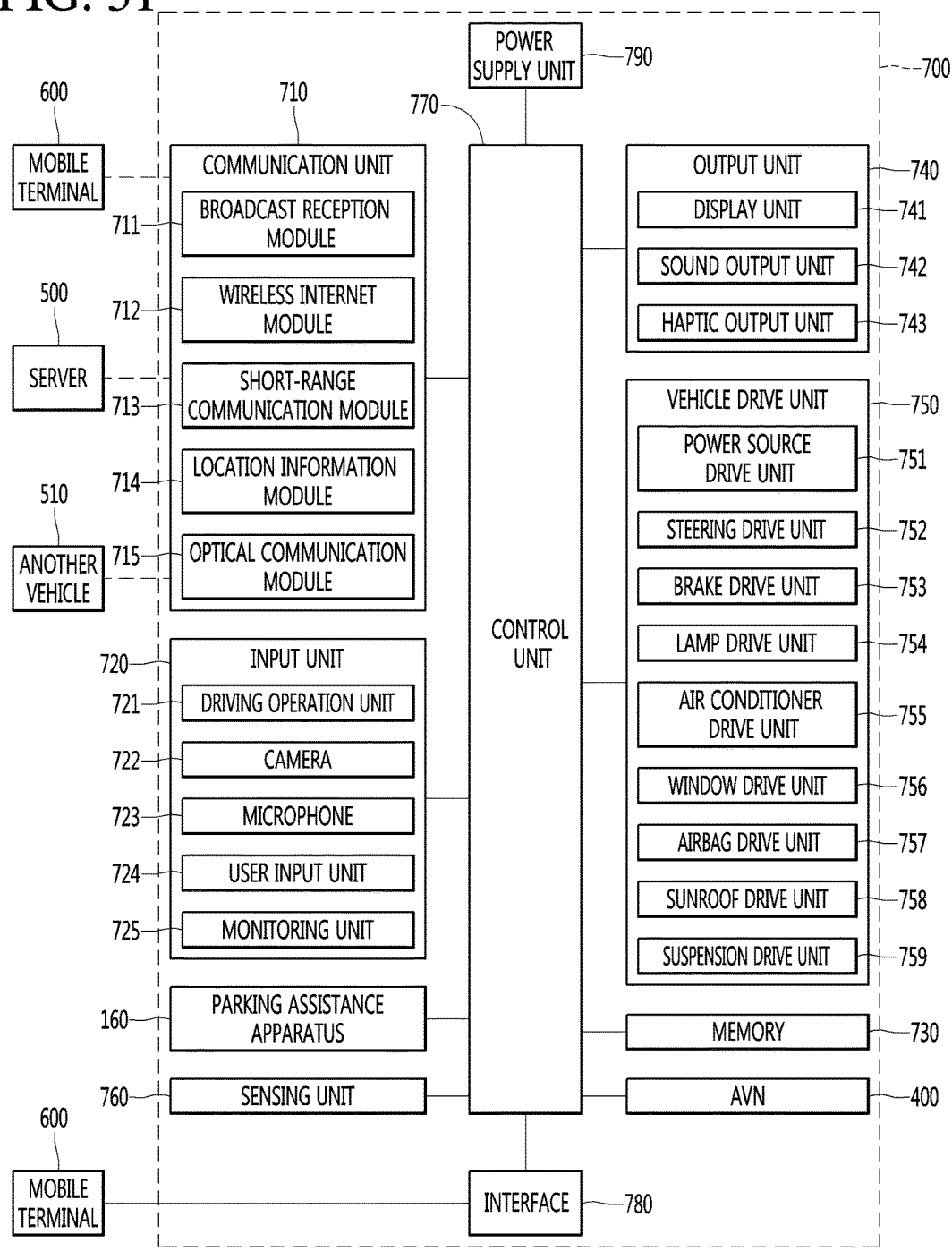
FIG. 31 is a diagram illustrating an example of internal components of the vehicle of FIG. 1, which has the above-described parking assistance apparatus.

Referring to the FIG. 31, the above-described parking assistance apparatus 100 may be included in the vehicle 700.

The vehicle 700 may include a communication unit 710, an input unit 720, a sensing unit 760, an output unit 740, a vehicle drive unit 750, a memory 730, an interface 780, a controller 770, a power supply unit 790, a parking assistance apparatus 100 and AVN apparatus 400. Here, among the units included in the parking assistance apparatus 100 and the units of the vehicle 700, the units having the same names are described as being included in the vehicle 700.

The communication unit 710 may include one or more modules which permit communication such as wireless communication between the vehicle and the mobile terminal 600, between the vehicle and the external server 50 or between the vehicle and the other vehicle 510. Further, the communication unit 710 may include one or more modules which connect the vehicle to one or more networks.

The communication unit 710 includes a broadcast receiving module 711, a wireless Internet module 712, a short-range communication module 713, and an optical communication module 715.

The broadcast reception module 711 receives a broadcast signal or broadcast related information from an external broadcast management server through a broadcast channel. Here, the broadcast includes a radio broadcast or a TV broadcast.

The wireless Internet module 712 refers to a wireless Internet access module and may be provided inside or outside the vehicle. The wireless Internet module 712 transmits and receives a wireless signal through a communication network according to wireless Internet access technologies.

Examples of such wireless Internet access technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 712 may transmit/receive data according to one or more of such wireless Internet technologies, and other Internet technologies as well. For example, the wireless Internet module 712 may wirelessly exchange data with the external server 500. The wireless Internet module 712 may receive weather information and road traffic state information (e.g., transport protocol experts group (TPEG) information) from the external server 500.

The short-range communication module 713 is configured to facilitate short-range communication. Such short-range communication may be supported using at least one of Bluetooth™, Radio Frequency Identification (RFID), Infrared Data Association (IrDA), Ultra-Wideband (UWB), Zig-Bee, Near Field Communication (NFC), Wireless-Fidelity (Wi-Fi), Wi-Fi Direct, Wireless USB (Wireless Universal Serial Bus), and the like.

The short-range communication module 713 may form a wireless local area network to perform short-range communication between the vehicle and at least one external device. For example, the short-range communication module 713 may wirelessly exchange data with the mobile terminal 600. The short-range communication module 713 may receive weather information and road traffic state information (e.g., transport protocol experts group (TPEG) information) from the mobile terminal 600. When a user rides in the vehicle, the mobile terminal 600 of the user and the vehicle may pair with each other automatically or by executing the application of the user.

A location information module 714 acquires the location of the vehicle and a representative example thereof includes a global positioning system (GPS) module. For example, the vehicle may acquire the location of the vehicle using a signal received from a GPS satellite upon utilizing the GPS module.

The optical communication module 715 may include a light emitting unit and a light reception unit.

The light reception unit may convert a light signal into an electric signal and receive information. The light reception unit may include a photodiode (PD) for receiving light. The photodiode may covert light into an electric signal. For example, the light reception unit may receive information on a preceding vehicle through light emitted from a light source included in the preceding vehicle.

The light emitting unit may include at least one light emitting element for converting electrical signals into a light signal. Here, the light emitting element may be a Light Emitting Diode (LED). The light emitting unit converts electrical signals into light signals to emit the light. For example, the light emitting unit may externally emit light via flickering of the light emitting element corresponding to a prescribed frequency. In some implementations, the light emitting unit may include an array of a plurality of light emitting elements. In some implementations, the light emitting unit may be integrated with a lamp provided in the vehicle. For example, the light emitting unit may be at least one selected from among a headlight, a taillight, a brake light, a turn signal, and a sidelight. For example, the optical communication module 715 may exchange data with the other vehicle 510 via optical communication.

The input unit 720 may include a driving operation unit 721, a monitoring unit 195, for example a camera, a microphone 723 and a user input unit 724.

Figure 7:
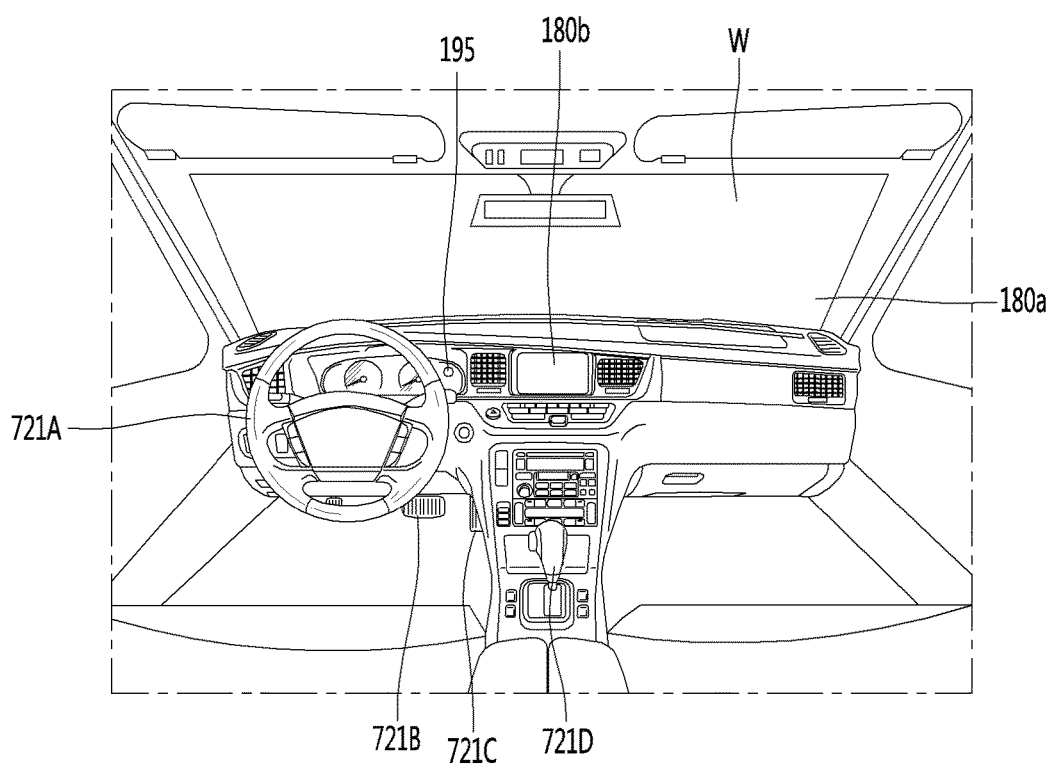
FIG. 7 is a diagram illustrating an example of an inner appearance of the vehicle having the parking assistance apparatus according to some implementations.

The driving operation unit 721 receives user input for driving of the vehicle (see FIG. 7). The driving operation unit 721 may include a steering input unit 721A, a shift input unit 721D, an acceleration input unit 721C and a brake input unit 721B.

The steering input unit 721A is configured to receive user input with regard to the direction of travel of the vehicle. The steering input unit 721A may include a steering wheel using rotation. In some implementations, the steering input unit 721A may be configured as a touchscreen, a touch pad, or a button.

The shift input unit 721D is configured to receive input for selecting one of Park (P), Drive (D), Neutral (N), and Reverse (R) gears of the vehicle from the user. The shift input unit 721D may have a lever form. In some implementations, the shift input unit 721D may be configured as a touchscreen, a touch pad, or a button.

The acceleration input unit 721C is configured to receive input for acceleration of the vehicle from the user. The brake input unit 721B is configured to receive input for speed reduction of the vehicle from the user. Each of the acceleration input unit 721C and the brake input unit 721B may have a pedal form. In some implementations, the acceleration input unit 721C or the brake input unit 721B may be configured as a touchscreen, a touch pad, or a button.

The camera 722 may include an image sensor and an image processing module. The camera 722 may process a still image or a moving image obtained by the image sensor (e.g., CMOS or CCD). In addition, the image processing module processes the still image or the moving image acquired through the image sensor, extracts necessary information, and delivers the extracted information to the controller 770. The vehicle may include the camera 722 for capturing the front image of the vehicle or the image of the vicinity of the vehicle and the monitoring unit 725 for capturing the image of the space inside the vehicle.

The monitoring unit 725 may acquire an image of a passenger. The monitoring unit 725 may acquire an image for biometric information of the passenger.

Although the monitoring unit 725 and the camera 722 are included in the input unit 720 in FIG. 31, the camera 722 may be included in the parking assistance apparatus 100 as described above.

The microphone 723 may process external sound signals into electrical data. The processed data may be utilized in various ways according to a function that the vehicle is performing. The microphone 723 may convert a user voice command into electrical data. The converted electrical data may be transmitted to the controller 770.

Meanwhile, in some implementations, a camera 722 or the microphone 723 may not be included in the input unit 720 but may be included in the sensing unit 760.

The user input unit 724 is configured to receive information from the user. When information is input via the user input unit 724, the controller 770 may control the operation of the vehicle to correspond to the input information. The user input unit 724 may include a touch input unit or a mechanical input unit. In some implementations, the user input unit 724 may be located in a region of the steering wheel. In this case, the driver may operate the user input unit 724 with the fingers while gripping the steering wheel.

The sensing unit 760 is configured to sense signals associated with, for example, signals related to driving of the vehicle. To this end, the sensing unit 760 may include a collision sensor, a wheel sensor, a speed sensor, tilt sensor, a weight sensor, a heading sensor, a yaw sensor, a gyro sensor, a position module, a vehicle forward/reverse sensor, a battery sensor, a fuel sensor, a tire sensor, a steering sensor based on rotation of the steering wheel, a vehicle interior temperature sensor, a vehicle interior humidity sensor, an ultrasonic sensor, a radar, a Lidar, etc.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle information, etc.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric sensor. The biometric sensor senses and acquires biometric information of the passenger. The biometric information may include fingerprint information, iris-scan information, retina-scan information, hand geometry information, facial recognition information, and voice recognition information. The biometric sensor may include a sensor for sensing biometric information of the passenger. Here, the monitoring unit 725 and the microphone 723 may operate as a sensor. The biometric sensor may acquire hand geometry information and facial recognition information through the monitoring unit 725.

The output unit 740 is configured to output information processed by the controller 770. The output unit 740 may include a display unit 741, a sound output unit 742, and a haptic output unit 743.

The display unit 741 may display information processed by the controller 770. For example, the display unit 741 may display vehicle associated information. Here, the vehicle associated information may include vehicle control information for direct control of the vehicle or parking assistance information for aiding in driving of the vehicle. In addition, the vehicle associated information may include vehicle state information that indicates the current state of the vehicle or vehicle traveling information regarding traveling of the vehicle. The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle and the user and also function to provide an output interface between the vehicle and the user. In this case, the display unit 741 may include a touch sensor which senses a touch to the display unit 741 so as to receive a control command in a touch manner. When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some implementations, the display unit 741 may be implemented as a head up display (HUD). When the display unit 741 is implemented as a HUD, information may be output via a transparent display provided at the windshield. Alternatively, the display unit 741 may include a projector module to output information via an image projected onto the windshield.

The sound output unit 742 is configured to convert electrical signals from the controller 170 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control of a power source inside the vehicle.

For example, in the case where a fossil fuel based engine is a power source, the power source drive unit 751 may perform electronic control of the engine. As such, the power source drive unit 751 may control, for example, an output torque of the engine. In the case where the power source drive unit 751 is an engine, the power source drive unit 751 may control the speed of the vehicle by controlling the output torque of the engine under the control of the controller 770.

In another example, in the case where an electric motor is a power source, the power source drive unit 751 may perform control of the motor. As such, the power source drive unit 751 may control, for example, the RPM and torque of the motor.

The steering drive unit 752 may perform electronic control of a steering apparatus inside the vehicle. The steering drive unit 752 may change the direction of travel of the vehicle. The brake drive unit 753 may perform electronic control of a brake apparatus inside the vehicle. For example, the brake drive unit 753 may reduce the speed of the vehicle by controlling the operation of brakes located at wheels. In another example, the brake drive unit 753 may adjust the direction of travel of the vehicle leftward or rightward by differentiating the operation of respective brakes located at left and right wheels.

The lamp drive unit 754 may turn at least one lamp arranged inside and outside the vehicle on or off. In addition, the lamp drive unit 754 may control, for example, the intensity and direction of light of each lamp. For example, the lamp drive unit 754 may perform control of a turn signal lamp or a brake lamp.

The air conditioner drive unit 755 may perform electronic control of an air conditioner inside the vehicle. For example, when the interior temperature of the vehicle is high, the air conditioner drive unit 755 may operate the air conditioner to supply cold air to the interior of the vehicle.

The window drive unit 756 may perform electronic control of a window apparatus inside the vehicle. For example, the window drive unit 756 may control opening or closing of left and right windows of the vehicle.

The airbag drive unit 757 may perform the electronic control of an airbag apparatus inside the vehicle. For example, the airbag drive unit 757 may control an airbag to be deployed in a dangerous situation.

The sunroof drive unit 758 may perform electronic control of a sunroof apparatus inside the vehicle. For example, the sunroof drive unit 758 may control opening or closing of a sunroof.

The suspension drive unit 759 may perform electronic control of a suspension apparatus inside the vehicle. For example, when a road surface is uneven, the suspension drive unit 759 may control the suspension apparatus to reduce vibrations of the vehicle.

The memory 730 is electrically connected to the controller 770. The memory 730 may store basic data of the unit, control data for operation control of the unit and input/output data. The memory 730 may be various storage apparatuses, which are implemented in a hardware manner, such as a ROM, RAM, EPROM, flash drive and hard drive. The memory 730 may store a variety of data for overall operation of the vehicle, such as a program for processing or control of the controller 770.

The interface 780 may serve as a passage for various kinds of external devices that are connected to the vehicle. For example, the interface 780 may have a port that is connectable to the mobile terminal 600 and may be connected to the mobile terminal 600 via the port. In this case, the interface 780 may exchange data with the mobile terminal 600.

The interface 780 may serve as a passage for providing electric energy to the connected mobile terminal 600. When the mobile terminal 600 is electrically connected to the interface 780, the interface 780 may provide electric energy supplied from the power supply unit 790 to the mobile terminal 600 under control of the controller 770.

The controller 770 may control the overall operation of each unit inside the vehicle. The controller 770 may be referred to as an Electronic Control Unit (ECU).

The controller 770 may perform a function corresponding to the delivered signal according to delivery of a signal for executing the parking assistance apparatus 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and electric units for the implementation of other functions.

The controller 770 may perform the role of the above-described processor 170. That is, the processor 170 of the parking assistance apparatus 100 may be directly set in the controller 770 of the vehicle. In such an implementation, the parking assistance apparatus 100 may be understood as a combination of some components of the vehicle.

Alternatively, the controller 770 may control the components to transmit information requested by the processor 170.

The power supply unit 790 may supply power required to operate the respective components under the control of the controller 770. In particular, the power supply unit 790 may receive power from, for example, a battery inside the vehicle.

The AVN apparatus 400 may exchange data with the controller 770. The controller 770 may receive navigation information from the AVN apparatus or a separate navigation apparatus. Here, the navigation information may include destination information, information on a route to the destination, map information related to vehicle traveling and current position information of the vehicle.

According to the present disclosure, the parking assistance apparatus can search a short-distance available parking space by acquiring information on a short-distance environment around the vehicle using a short-distance sensor and, simultaneously, search a long-distance available parking space by acquiring information on a long-distance environment around the vehicle using a long-distance sensor, thereby more quickly detecting an available parking space in a wider area.

Moreover, the parking assistance apparatus can detect an available parking space by simultaneously using a short-distance sensor based on image detection and a long-distance sensor based on space detection, so that it is possible to accurately provide a user with the available parking space.

Also, the parking assistance apparatus can provide a GUI that effectively provides the user with information on the detected long-distance/short-distance available parking spaces and easily sets the parking assistance function.

In addition, the parking assistance apparatus can design a route such that automatic parking is safely performed on a selected long-distance target parking space, and perform an automatic operation along the route, thereby providing the parking assistance function of safety and quickly performing automatic parking on a desired space.

The above described features, configurations, effects, and the like are included in at least one of the implementations of the present disclosure, and should not be limited to only one implementation. In addition, the features, configurations, effects, and the like as illustrated in each implementation may be implemented with regard to other implementations as they are combined with one another or modified by those skilled in the art. Thus, content related to these combinations and modifications should be construed as including in the scope and spirit of the disclosure as disclosed in the accompanying claims.

Further, although some implementations have been mainly described until now, they are just exemplary and do not limit the present disclosure. Thus, those skilled in the art to which the present disclosure pertains will know that various modifications and applications which have not been exemplified may be carried out within a range which does not deviate from the essential characteristics of the implementations. For instance, the constituent elements described in detail in the exemplary implementations can be modified to be carried out. Further, the differences related to such modifications and applications shall be construed to be included in the scope of the present disclosure specified in the attached claims.

What is claimed is:

1. A parking assistance apparatus comprising:
   a first sensor configured to sense a first environment corresponding to a first distance around a vehicle;
   a second sensor configured to sense a second environment corresponding to a second distance around the vehicle, the second distance being greater than the first distance;
   a display configured to display a graphic image; and
   at least one processor configured to:
      acquire first information regarding the first environment around the vehicle and second information regarding the second environment around the vehicle from the respective first sensor and the second sensor;
      detect an available parking space based on the first information regarding the first environment around the vehicle and based on the second information regarding the second environment around the vehicle; and
      based on an available parking space being detected outside of the first environment, control the display to display information regarding the available parking space,
   wherein the vehicle is a first vehicle, and the at least one processor is further configured to:
      based on a second vehicle being detected as exiting a space, determine, as the available parking space, the space from which the second vehicle exits.

2. The parking assistance apparatus according to claim 1, further comprising a monitoring unit configured to monitor a driver,
   wherein the at least one processor is further configured to:
      detect a physical motion of the driver indicating an intent to park the vehicle; and
      based on detecting the physical motion of the driver indicating the intent to park the vehicle and based on the vehicle travelling at a predetermined speed or less for a predetermined time or more, control the display to propose executing a parking assistance mode.

3. The parking assistance apparatus according to claim 1, wherein the second sensor comprises at least one of a blind spot detection sensor configured to sense a quadrangular area at a side rear of the vehicle or a stereo camera configured to photograph a front or rear area of the vehicle and configured to sense a distance to an object, and
   wherein the first sensor comprises an around-view monitoring camera configured to photograph surroundings of the vehicle.

4. The parking assistance apparatus according to claim 1, wherein the at least one processor is further configured to:
   based on an empty space having a predetermined size or more being detected outside of the first environment, determine the empty space as the available parking space.

5. The parking assistance apparatus according to claim 1, wherein the vehicle is a first vehicle, and the at least one processor is further configured to:
   based on a third vehicle being detected as performing an exiting operation, determine a position of the third vehicle as the available parking space,
   wherein the third vehicle that is detected as performing the exiting operation indicates a state of at least one of a vehicle in which a driver is riding, a vehicle in which a brake lamp is turned on, or a vehicle from which an engine starting sound is generated.

6. The parking assistance apparatus according to claim 1, wherein the at least one processor is further configured to:
   calculate a size of the second vehicle;
   compare the size of the second vehicle with a size of the first vehicle; and
   based on comparing the size of the second vehicle with the size of the first vehicle, determine whether the first vehicle is to be parked.

7. The parking assistance apparatus according to claim 1, wherein the at least one processor is further configured to:
   determine a parking standby position around the detected available parking space;
   control the first vehicle to move to the parking standby position while the second vehicle is exiting the space; and
   control the first vehicle to be on standby at the parking standby position until a time at which the second vehicle completes exiting the space.

8. The parking assistance apparatus according to claim 1, wherein the at least one processor is further configured to:
   based on a first parking space being detected at a first side of the vehicle and a second parking space being detected at a second side of the vehicle, scan the first parking space at the first side of the vehicle through the first sensor, and scan the second parking space at the second side of the vehicle through the second sensor.

9. The parking assistance apparatus according to claim 1, wherein:
   the first sensor comprises an image sensor,
   the second sensor comprises a distance-measuring sensor, and
   the at least one processor is further configured to:
      detect the available parking space through the image sensor; and
      based on an obstacle in the available parking space being detected through the distance-measuring sensor, determine that the available parking space is inappropriate for parking.

10. The parking assistance apparatus according to claim 1, wherein:
   the first sensor comprises an image sensor,
   the second sensor comprises a distance measuring sensor, and
   the at least one processor is further configured to:
      based on a parking restriction sign being detected in the available parking space through the image sensor after the available parking space is detected through the distance measuring sensor, determine that the available parking space is inappropriate for parking.

11. The parking assistance apparatus according to claim 1, wherein the at least one processor is further configured to:
based on the available parking space being detected, provide, through the display, a graphic user interface (GUI) for performing parking in the available parking space.

12. The parking assistance apparatus according to claim 11, wherein providing, through the display, the graphic user interface (GUI) for performing parking in the available parking space comprises:
displaying an image at a time when the available parking space is to be viewed and displaying a graphic image designating the available parking space.

13. The parking assistance apparatus according to claim 11, wherein providing, through the display, the graphic user interface (GUI) for performing parking in the available parking space comprises:
displaying a scroll GUI for displaying short-distance images that were previously photographed according to a user scroll input.

14. The parking assistance apparatus according to claim 11, wherein the at least one processor is further configured to:
generate a virtual map by synthesizing information regarding environments that were previously detected around the vehicle; and
control the display to display the virtual map and a graphic image representing the available parking space on the virtual map.

15. The parking assistance apparatus according to claim 11, wherein the display comprises a windshield display configured to display graphic images on a windshield of the vehicle, and
wherein the windshield display is configured to display an augmented reality view that designates the available parking space.

16. The parking assistance apparatus according to claim 12, wherein the first sensor comprises an around-view monitoring camera configured to photograph surroundings of the vehicle, and
the at least one processor is further configured to:
based on a detection that the available parking space is photographed by the around-view monitoring camera, control the display to display an image of a view around the vehicle.

17. The parking assistance apparatus according to claim 1, wherein the at least one processor is further configured to, based on a plurality of available parking spaces being detected:
evaluate the plurality of available parking spaces through at least one criteria; and
automatically set one of the plurality of available parking spaces as a target parking space based on an evaluation of the plurality of available parking spaces through the at least one criteria.

18. The parking assistance apparatus according to claim 1, wherein the at least one processor is configured to control the display to display a graphic image for guiding the vehicle to travel to the available parking space.

19. A vehicle comprising the parking assistance apparatus according to claim 1.

* * * * *